(12) United States Patent
Kubota et al.

(10) Patent No.: US 10,983,343 B2
(45) Date of Patent: Apr. 20, 2021

(54) DISPLAY SYSTEM, MOVING VEHICLE, METHOD FOR CONTROLLING THE DISPLAY SYSTEM, AND NON-TRANSITORY STORAGE MEDIUM

(71) Applicant: PANASONIC INTELLECTUAL PROPERTY MANAGEMENT CO., LTD., Osaka (JP)

(72) Inventors: Kosuke Kubota, Osaka (JP); Ken'ichi Kasazumi, Osaka (JP); Yoshiteru Mino, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

(21) Appl. No.: 16/363,534

(22) Filed: Mar. 25, 2019

(65) Prior Publication Data

US 2019/0302456 A1 Oct. 3, 2019

(30) Foreign Application Priority Data

Mar. 30, 2018 (JP) .............................. JP2018-069732

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01); *B60K 2370/334* (2019.05); *G02B 2027/014* (2013.01); *G02B 2027/0154* (2013.01)

(58) Field of Classification Search
CPC .............. B60K 35/00; B60K 2370/334; G02B 27/0149; G02B 27/0101; G02B 27/01; G02B 27/015; G02B 2027/0154; G02B 2027/014
USPC ......................................................... 359/630
See application file for complete search history.

(56) References Cited

U.S. PATENT DOCUMENTS

| 5,510,983 | A | * | 4/1996 | Iino ........................ B60K 35/00 |
| | | | | 340/441 |
| 8,953,247 | B2 | * | 2/2015 | Rumpf ............... G02B 27/0149 |
| | | | | 359/632 |
| 9,400,388 | B2 | * | 7/2016 | Yamada ................. G02B 27/01 |
| 10,310,263 | B2 | * | 6/2019 | Nakayama ............. B60K 35/00 |

(Continued)

FOREIGN PATENT DOCUMENTS

| JP | 2017-015954 | 1/2017 |
| JP | 2018-045103 | 3/2018 |
| WO | 2017/134865 | 8/2017 |

*Primary Examiner* — William R Alexander
(74) *Attorney, Agent, or Firm* — Greenblum & Bernstein, P.L.C.

(57) ABSTRACT

A display system according to an aspect includes a screen, a drive control unit, and a projection unit. The drive control unit has the screen moved in a movement direction. The projection unit renders an image on the screen by irradiating the screen with a light beam that scans the screen and projects a virtual image onto a projection plane with the light beam transmitted through the screen. The drive control unit has the screen moved in the movement direction such that an optical path leading to a rendering point on the screen varies its length according to a tilt angle defined by the projection plane with respect to a reference plane.

20 Claims, 13 Drawing Sheets

(56) References Cited

U.S. PATENT DOCUMENTS

| | | | | |
|---|---|---|---|---|
| 10,520,725 | B2* | 12/2019 | Nakamura | G02B 27/01 |
| 10,698,211 | B2* | 6/2020 | Kim | B60R 1/00 |
| 10,712,559 | B2* | 7/2020 | Fukushima | H04N 9/3155 |
| 10,712,560 | B2* | 7/2020 | Kwak | B60K 35/00 |
| 10,852,818 | B2* | 12/2020 | Saisho | B60K 35/00 |
| 2009/0160736 | A1* | 6/2009 | Shikita | G02B 27/0101 345/7 |
| 2011/0235185 | A1* | 9/2011 | Kanamori | G02B 27/01 359/630 |
| 2012/0188650 | A1* | 7/2012 | Rumpf | G02B 27/0149 359/630 |
| 2015/0116837 | A1* | 4/2015 | Yamada | B60K 35/00 359/632 |
| 2016/0025973 | A1* | 1/2016 | Guttag | B60K 35/00 345/7 |
| 2018/0113307 | A1 | 4/2018 | Kasazumi et al. | |
| 2018/0149868 | A1* | 5/2018 | Nakayama | B60K 37/04 |
| 2018/0267306 | A1* | 9/2018 | Nakamura | G02B 27/0179 |
| 2018/0339590 | A1* | 11/2018 | Fujie | B60R 1/00 |
| 2018/0364479 | A1* | 12/2018 | Kwak | G02B 27/0101 |
| 2018/0373036 | A1* | 12/2018 | Kim | B60R 1/00 |
| 2019/0025580 | A1 | 1/2019 | Nagano et al. | |
| 2019/0107886 | A1* | 4/2019 | Saisho | G01C 21/3697 |
| 2019/0196187 | A1 | 6/2019 | Kasazumi et al. | |
| 2019/0361235 | A1* | 11/2019 | Fukushima | G02B 27/0103 |
| 2020/0004015 | A1 | 1/2020 | Kasazumi et al. | |

\* cited by examiner

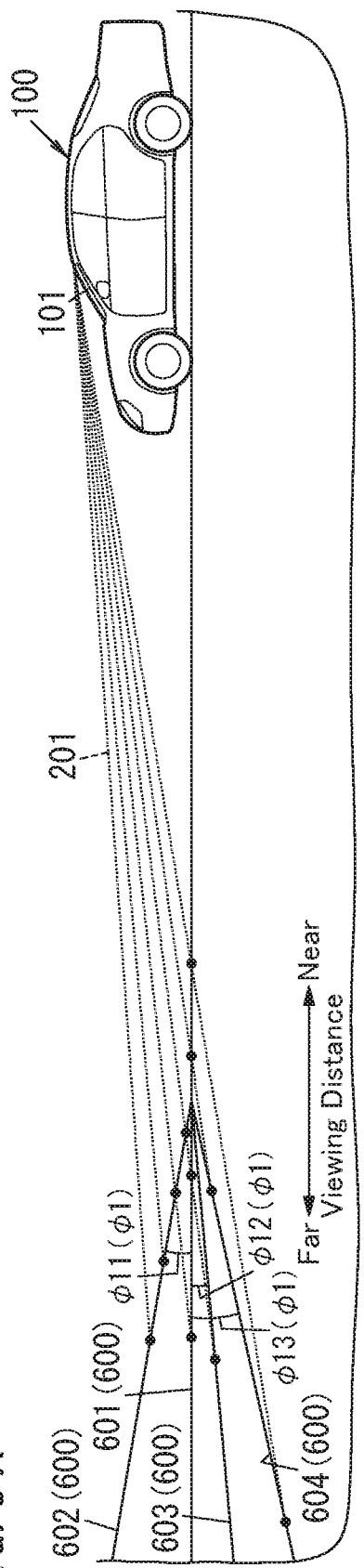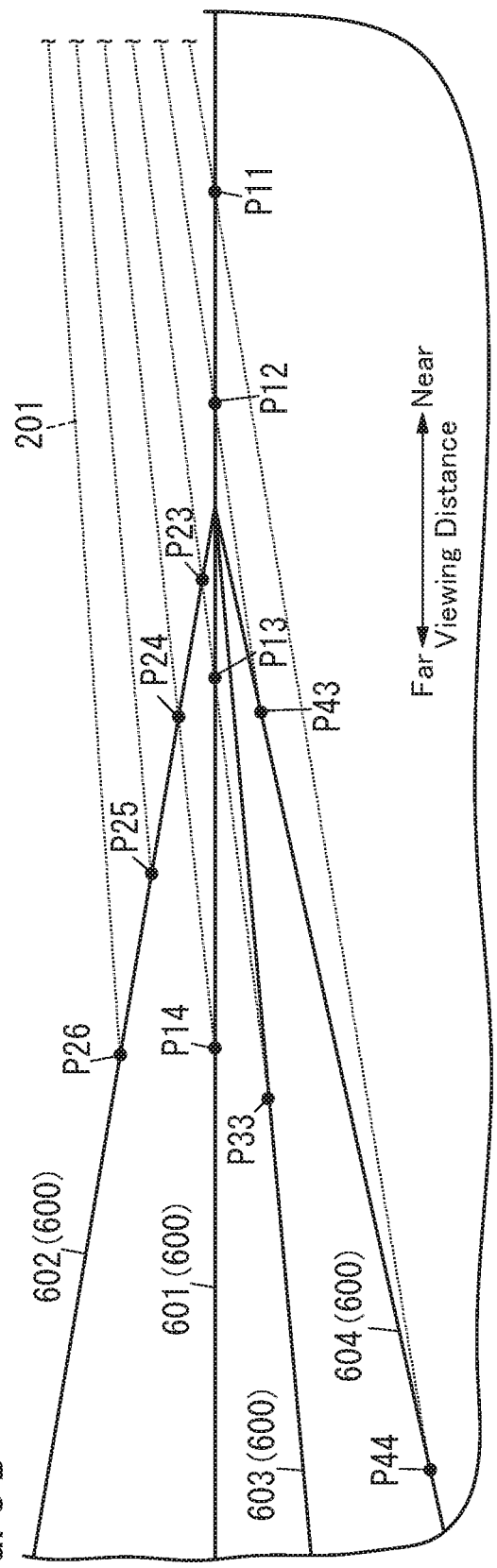

FIG. 10
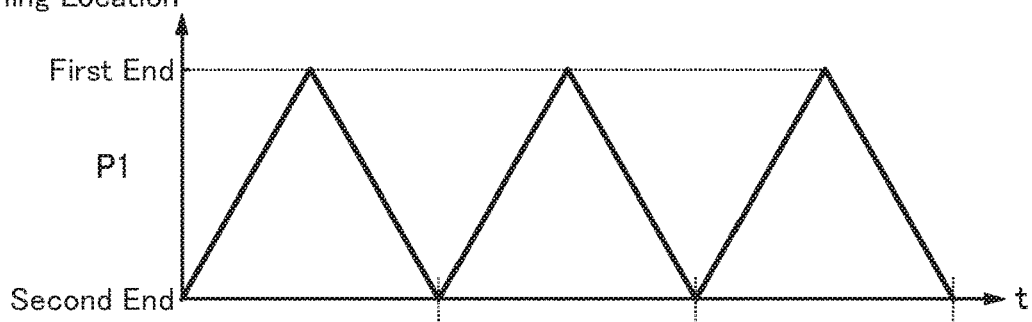
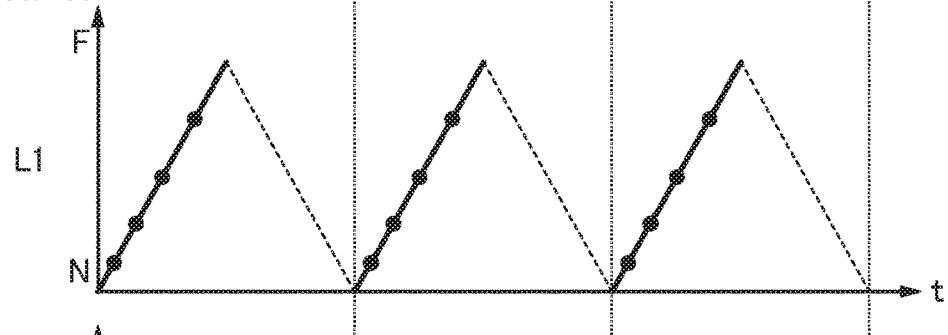
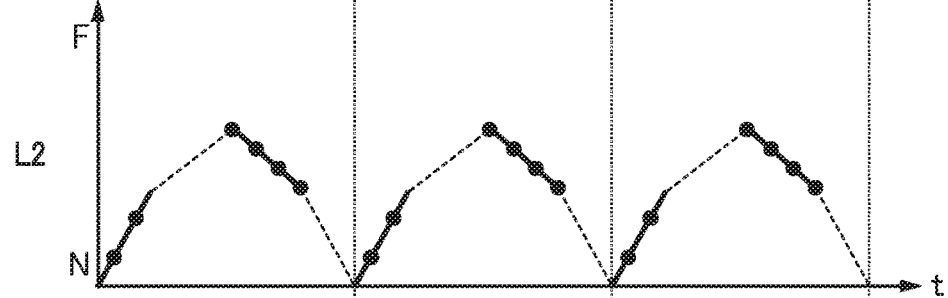
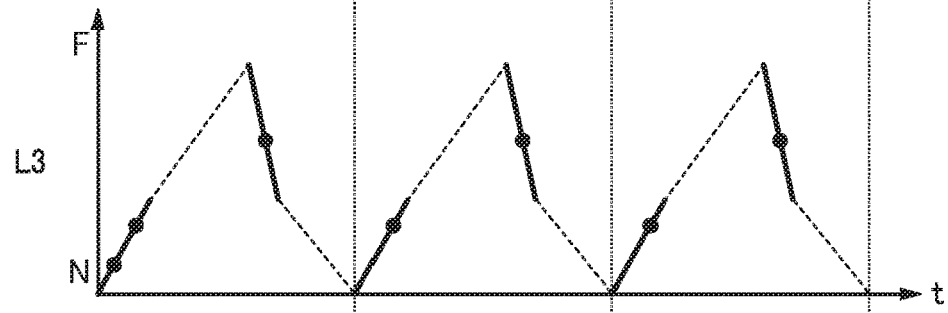
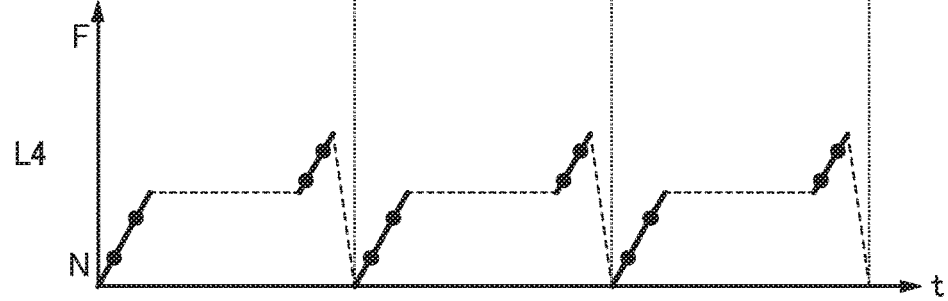

DISPLAY SYSTEM, MOVING VEHICLE, METHOD FOR CONTROLLING THE DISPLAY SYSTEM, AND NON-TRANSITORY STORAGE MEDIUM

CROSS-REFERENCE TO RELATED APPLICATION

This application claims the benefit of foreign priority to Japanese Patent Application No. 2018-069732 filed on Mar. 30, 2018, which is assigned to the assignee of the present application.

TECHNICAL FIELD

The present disclosure generally relates to a display system, a moving vehicle, a method for controlling the display system, and a non-transitory storage medium, and more particularly relates to a display system, a moving vehicle, a method for controlling the display system, and a non-transitory storage medium, all of which are configured or designed to project a virtual image onto a target space with light transmitted through a screen.

BACKGROUND ART

A head-up display device has been known in the art as a display system for vehicles, such as automobiles, which has the ability to present a virtual image to the driver such that the virtual image is appropriately superimposed on a real view in front of him or her, according to the situation surrounding his or her vehicle traveling (see, for example, WO 2017/134865 A1 (hereinafter referred to as D1)).

The display system of D1 includes a video display device such as a projector and a mirror for reflecting and projecting the video, produced on the video display device, toward a transparent windshield of a vehicle. The driver of the vehicle visually recognizes the video as a virtual image, appearing to be produced in front of him or her through the windshield, by actually watching the video being projected onto the windshield. The display system of D1 vertically moves the display area of the virtual image up and down by adjusting the angle of the mirror according to the grade of the road the vehicle is traveling on.

In the display system of D1, when a projection plane is tilted with respect to a reference plane, the degree of matching between the projection plane and the virtual image projected onto the projection plane tends to decrease.

SUMMARY

The present disclosure provides a display system, a moving vehicle, a method for controlling the display system, and a non-transitory storage medium, all of which are configured or designed to increase, even when a projection plane is tilted with respect to a reference plane, the degree of matching between the projection plane and the virtual image projected onto the projection plane.

A display system according to an aspect of the present disclosure includes a screen, a drive control unit, and a projection unit. The screen is movable in a movement direction. The drive control unit has the screen moved in the movement direction. The projection unit renders an image on the screen by irradiating the screen with a light beam that scans the screen and projects a virtual image onto a projection plane with the light beam transmitted through the screen. The drive control unit performs correction processing of having the screen moved in the movement direction such that an optical path leading to a rendering point on the screen varies its length according to a tilt angle defined by the projection plane with respect to a reference plane.

A moving vehicle according to another aspect of the present disclosure includes the display system described above, and a reflective member for reflecting the light beam coming from the projection unit.

A method for controlling a display system according to still another aspect of the present disclosure is designed to control a display system including a screen, a drive control unit, and a projection unit. The screen is movable in a movement direction. The drive control unit has the screen moved in the movement direction. The projection unit renders an image on the screen by irradiating the screen with a light beam that scans the screen and projects a virtual image onto a projection plane with the light beam transmitted through the screen. The method for controlling the display system includes making the drive control unit perform correction processing of having the screen moved in the movement direction such that an optical path leading to a rendering point on the screen varies its length according to a tilt angle defined by the projection plane with respect to a reference plane.

A non-transitory storage medium according to yet another aspect of the present, disclosure stores thereon a program that is designed to make a computer system execute the method for controlling the display system described above.

BRIEF DESCRIPTION OF DRAWINGS

FIG. 5A illustrates how the display system operates in one situation;

FIG. 5B illustrates, on a larger scale, a portion of FIG. 5A;

FIG. 10 is a graph showing a fourth exemplary operation of the display system;

DESCRIPTION OF EMBODIMENTS

(1) Overview

Figure 1:
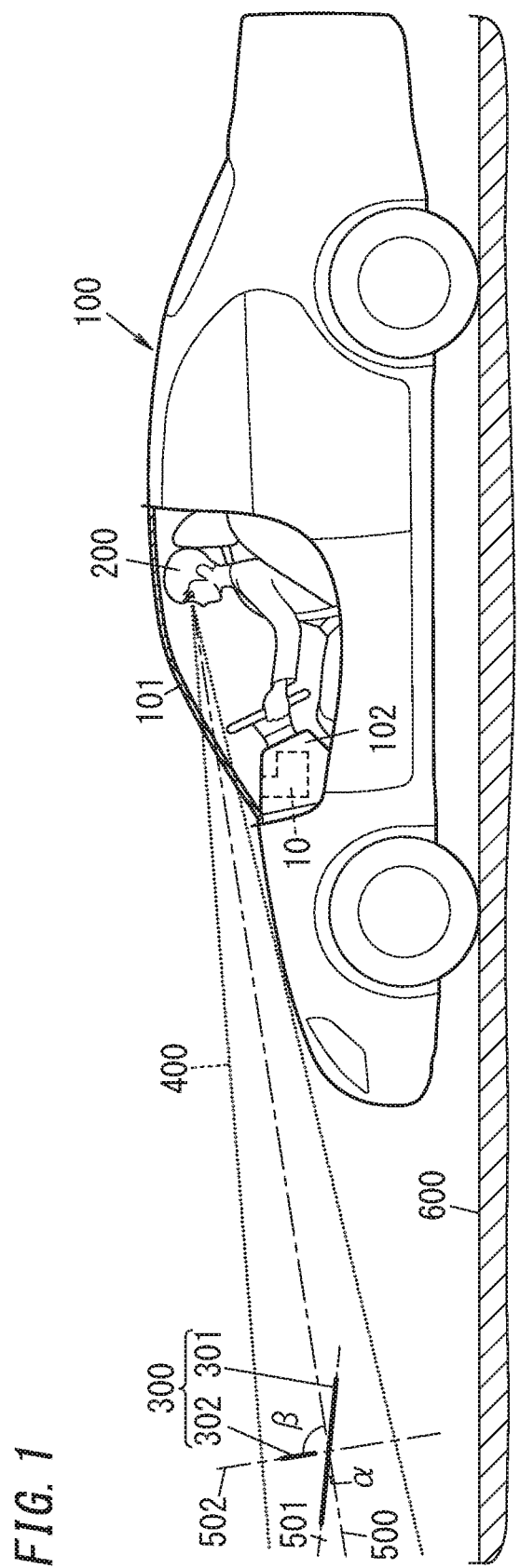
FIG. 1 is a schematic representation depicting an automobile equipped with a display system according to an exemplary embodiment of the present disclosure.

A display system 10 according to an exemplary embodiment may be implemented as a head-up display (HUD) for use in an automobile 100 as an exemplary moving vehicle as shown in FIG. 1.

This display system 10 is installed in the vehicle cabin of the automobile 100 so as to project an image onto the windshield 101 of the automobile 100 from under the windshield 101. In the example illustrated in FIG. 1, the display system 10 is arranged in a dashboard 102 under the windshield 101. When an image is projected onto the windshield 101 from the display system 10, the image reflected from the windshield 101 as a reflective member is visually recognized by the user 200 (i.e., the driver).

This display system 101 allows the user 200 to visually recognize, through the windshield 101, a virtual image 300 projected onto a target space 400 in front (and outside) of the automobile 100. As used herein, the "virtual image" refers to an image formed, as if an object were actually present, on the user's 200 eyes by a reflected light beam, when the light beam emerging from the display system 10 is reflected from a reflector such as the windshield 101 to turn into the reflected light beam. This allows the user 200 who is driving the automobile 100 to view the virtual image 300 projected by the display system 10 such that the virtual image 300 is superimposed on his or her view of the real space in front of the automobile 100. Thus, this display system 10 allows the user 200 to be presented as the virtual image 300 with, and visually recognize, various types of driver assistance information including vehicle speed information, navigation information, pedestrian information, foregoing vehicle information, lane deviation information, and vehicle condition information. This allows the user 200 to visually acquire the driver assistance information just by shifting his or her gaze only slightly in the state where he or she is watching the real space in front of the windshield 101.

In the display system 10 of this embodiment, the virtual image 300 formed in the target space 400 includes at least two types of virtual images, namely, a first virtual image 301 and a second virtual image 302. As used herein, the "first virtual image" refers to a virtual image 300 (301) formed on a first virtual plane 501. The "first virtual plane" is a virtual plane, of which the tilt angle α with respect to the optical axis 500 of the display system 10 is smaller than a predetermined value γ (i.e., a virtual plane that satisfies α<γ). Also, as used herein, the "second virtual image" refers to a virtual image 300 (302) formed on a second virtual plane 502. The "second virtual plane" is a virtual plane, of which the tilt angle β with respect to the optical axis 500 of the display system 10 is larger than the predetermined value γ (i.e., a virtual plane that satisfies (β>γ). As used herein, the "optical axis" refers to the optical axis of a projection optical system 4 (see FIG. 3) to be described later, and means an axis that passes through the center of the target space 400 and extends along the optical path of the virtual image 300. The predetermined value γ may be 45 degrees, for example, and the tilt angle β may be 90 degrees, for example.

Also, in the display system 10 of this embodiment, the virtual image 300 formed in the target space 400 includes not only the first virtual image 301 and the second virtual image 302 but also a third virtual image 303 (see FIG. 2) as well. As used herein, the "third virtual image," as well as the second virtual image 302, refers to a virtual image 300 (303) formed on the second virtual plane 502, of which the tilt angle β with respect to the optical axis 500 is larger than the predetermined value γ.

In this embodiment, the optical axis 500 extends, in the target space 400 in front of the automobile 100, along the road surface 600 in front of the automobile 100. The first virtual image 301 is formed on the first virtual plane 501 that is generally parallel to the road surface 600. The second virtual image 302 and the third virtual image 303 are formed on the second virtual plane 502 that is generally perpendicular to the road surface 600. For example, if the road surface 600 is a horizontal plane, the first virtual image 301 is displayed on a plane that is generally parallel to the horizontal plane and the second virtual image 302 and the third virtual image 303 are displayed on a vertical plane.

Figure 2:
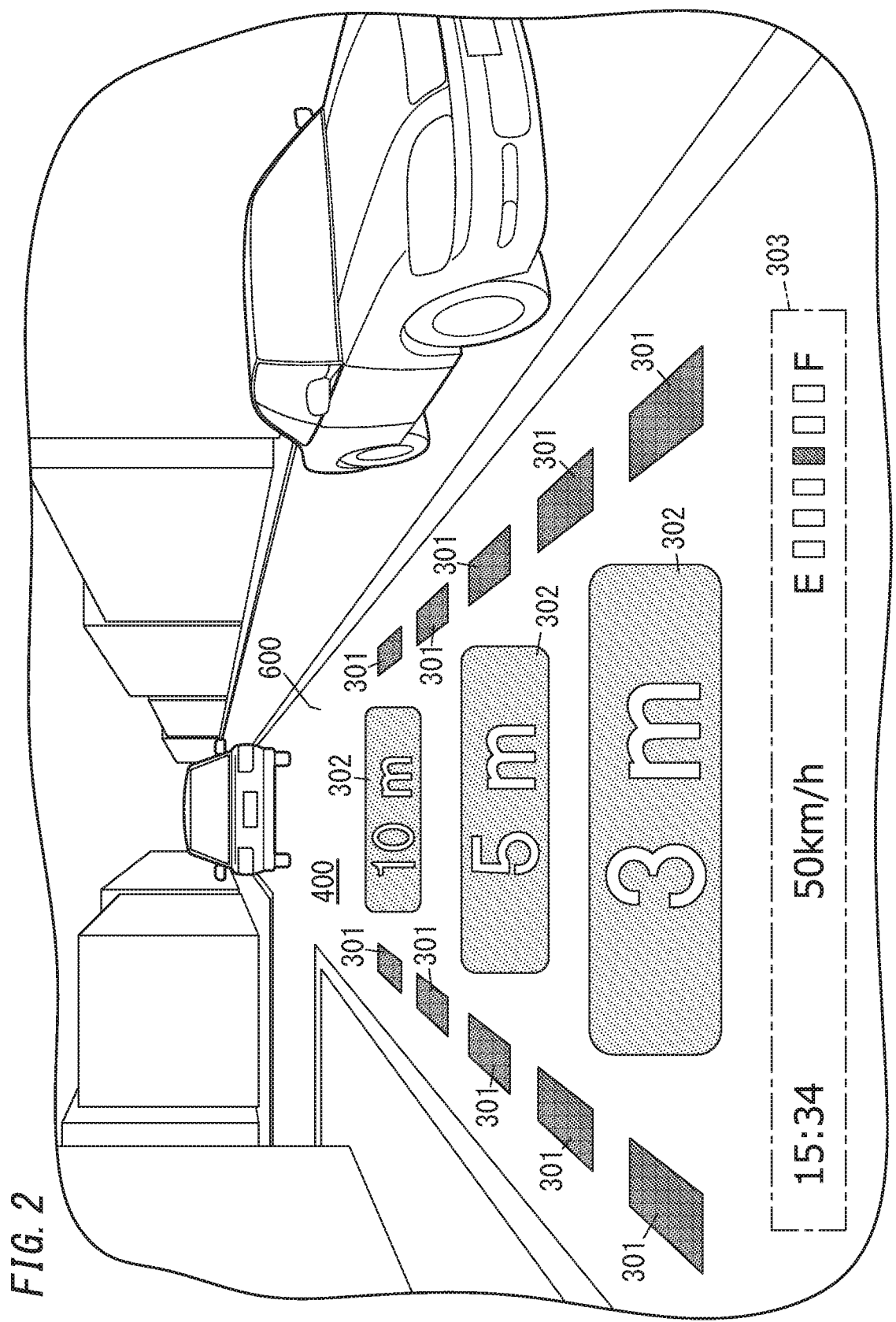
FIG. 2 is a schematic representation depicting a field of view of a user of the display system.

FIG. 2 schematically depicts the field of view of the user 200. As shown in FIG. 2, the display system 10 of this embodiment has the ability to present the first virtual image 301 to be visually recognized as a series of images appearing one after another in the depth direction along the road surface 600 and the second virtual image 302 and third virtual image 303 to be visually recognized as upright images located at certain distances from the user 200 over the road surface 600. Therefore, to the user's 200 eyes, the first virtual image 301 appears to be located on a plane that is generally parallel to the road surface 600, and the second and third virtual images 302 and 303 appear to be located on a plane that is generally perpendicular to the road surface 600. The first virtual image 301 may indicate, for example, the traveling direction of the automobile 100 as a piece of navigation information. Specifically, the first virtual image 301 may present, on the road surface 600, an arrow indicating a right turn or a left turn. The second virtual image 302 may indicate, for example, the distance to a foregoing vehicle or a pedestrian. Specifically, the second virtual image 302 may present, on the foregoing vehicle, the distance to the foregoing vehicle (i.e., an inter-vehicular distance). The third virtual image 303 may indicate, for example, the current time, vehicle speed information, and vehicle condition information. Specifically, the third virtual image 303 may present these pieces of information in the forms of characters, numerals, and signs or an icon representing some type of gauge such as a fuel gauge.

(2) Details

Figure 3:
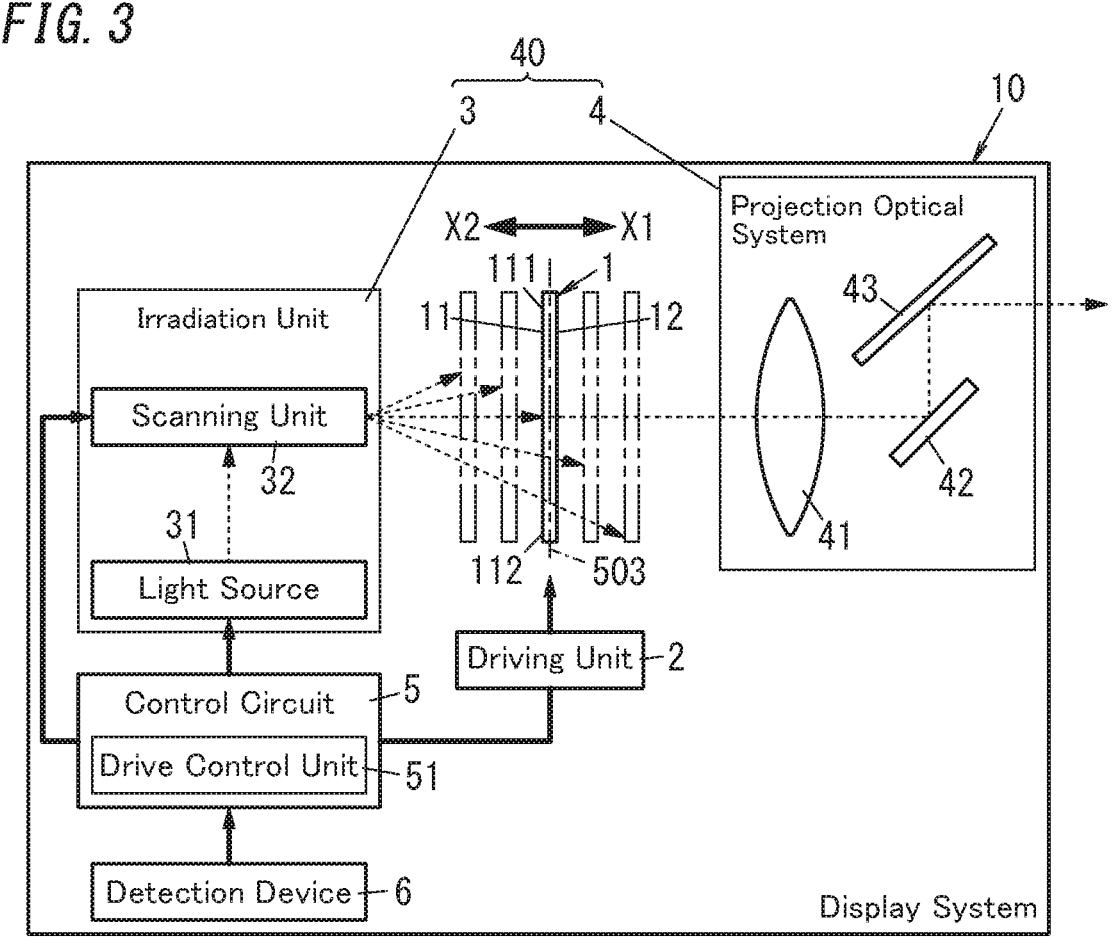
FIG. 3 is a block diagram illustrating a configuration for the display system.

The display system 10 of this embodiment includes a screen 1, a driving unit 2, an irradiation unit 3, a projection optical system 4, a control circuit 5, and a detection device 6 as shown in FIG. 3. An automobile 100 as an exemplary moving vehicle according to this embodiment includes the display system 10 and a windshield 101 serving as a reflective member for reflecting the light beam coming from a projection unit 40 (to be described later) as shown in FIG. 1.

The screen 1 is configured to be movable in a movement direction X (i.e., the direction indicated by the double-headed arrow X1-X2 in FIG. 3) with respect to the housing of the display system 10, for example. That is to say, if the display system 10 is arranged in the dashboard 102, the screen 1 is movable in the movement direction X in the dashboard 102.

The screen 1 has a light-transmitting property, and produces an image thereon to form the virtual image 300 (see FIG. 1) in the target space 400 (see FIG. 1). That is to say, an image is rendered on the screen 1 by the light beam emitted from the irradiation unit 3 and the virtual image 300 is formed in the target space 400 by the light beam transmitted through the screen 1. The screen 1 may be implemented as a rectangular plate member with a light diffusion property, for example. The screen 1 has a surface 11 and a back surface 12 on both sides thereof in the thickness direction. In this embodiment, multiple micro-lenses may be formed, for example, on the surface 11 of the screen 1 to impart the light diffusion property to the surface 11 of the screen 1. The screen 1 is arranged between the irradiation unit 3 and the projection optical system 4 with the surface 11 facing the irradiation unit 3. In other words, the surface 11 of the screen 1 is a plane of incidence on which the light beam coming from the irradiation unit 3 is incident.

The surface 11 of the screen 1 is parallel to a plane 503. The screen 1 is configured to be movable in the movement direction X perpendicular to the plane 503. As used herein, a "plane" refers to a virtual plane defining the movement direction of the screen 1 and is not a real plane which is actually existent in the real world. The screen 1 is configured to be movable straight in the movement direction X with the surface 11 kept parallel to the plane 503. In this embodiment, the surface 11 of the screen 1 has a first end 111 and a second end 112 as both ends thereof in the direction parallel to the plane 503 (i.e., the direction parallel to the surface 11 of the screen 1 on the paper on which FIG. 3 is illustrated). In other words, the screen 1 has the first end 111 corresponding to a distal end, located more distant from a projection unit 40 (to be described later), of a reference plane 601 (see FIG. 5) and the second end 112 corresponding to a proximal end, located closer to the projection unit 40, of the reference plane 601. In the following description, the direction in which a line connecting the first end 111 and the second end 112 together along the surface 11 of the screen 1 extends hereinafter referred to as a "longitudinal direction" of the screen 1.

The driving unit 2 moves the screen 1 in the movement direction X. In this embodiment, the driving unit 2 may move the screen 1 in the movement direction X, which is one of first and second directions X1 and X2 that are two opposite directions. Specifically, the first direction X1 is the direction indicated by the arrow X1 in FIG. 3 (i.e., to the right on FIG. 3) and is the direction in which the screen 1 goes away from the irradiation unit 3 (i.e., the direction in which the screen 1 comes toward the projection optical system 4). The second direction X2 is the direction indicated by the arrow X2 in FIG. 3 (i.e., to the left on FIG. 3) and is the direction in which the screen 1 comes toward the irradiation unit 3 (i.e., the direction in which the screen 1 goes away from the projection optical system 4). The driving unit 2 may be implemented as an electrically driven actuator such as a voice coil motor and operate in accordance with a first control signal from the control circuit 5.

The irradiation unit 3 is a scanning type light radiation unit and irradiates the screen 1 with the light beam. That is to say, the irradiation unit 3 irradiates the surface 11 of the screen 1 with a scanning light beam such that the beam spot formed on the surface 11 of the screen 1 by the light beam moves on the screen 1. Specifically, the irradiation unit 3 includes a light source 31 and a scanning unit 32. In this irradiation unit 3, the light source 31 and the scanning unit 32 each operate in accordance with a second control signal from the control circuit 5.

The light source 31 is implemented as a laser module for emitting a laser beam. Specifically, this light source 31 includes a red laser diode for emitting a red (R) laser beam, a green laser diode for emitting a green (G) laser beam, and a blue laser diode for emitting a blue (B) laser beam. The laser beams in the three colors, emitted from these three types of laser diodes, are combined together by a dichroic mirror, for example, and the resultant combined laser beam is incident on the scanning unit 32.

The scanning unit 32 irradiates the screen 1 with the light beam emitted from the light source 31 to scan the surface 11 of the screen 1 with the light beam. In this embodiment, the scanning unit 32 performs a raster scan of scanning the surface 11 of the screen 1 two-dimensionally, i.e., in the longitudinal direction and in the lateral direction. As used herein, the "lateral direction" is a direction that is parallel to the surface 11 of the screen 1 and perpendicular to the longitudinal direction on the surface 11. That is to say, the lateral direction is the direction coming out of the paper on which FIG. 3 is drawn.

Figure 4A:
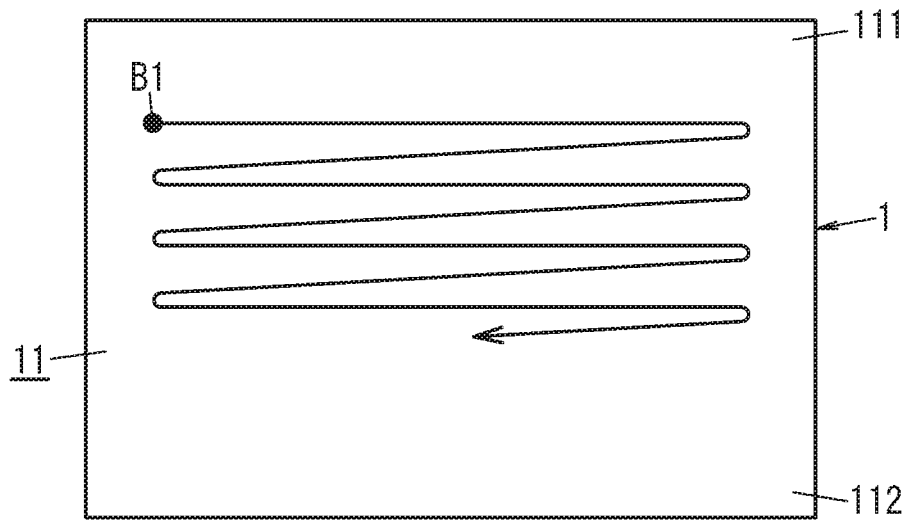
FIG. 4A schematically illustrates the movement of a beam spot on the screen for the homeward path in the display system.
Figure 4B:
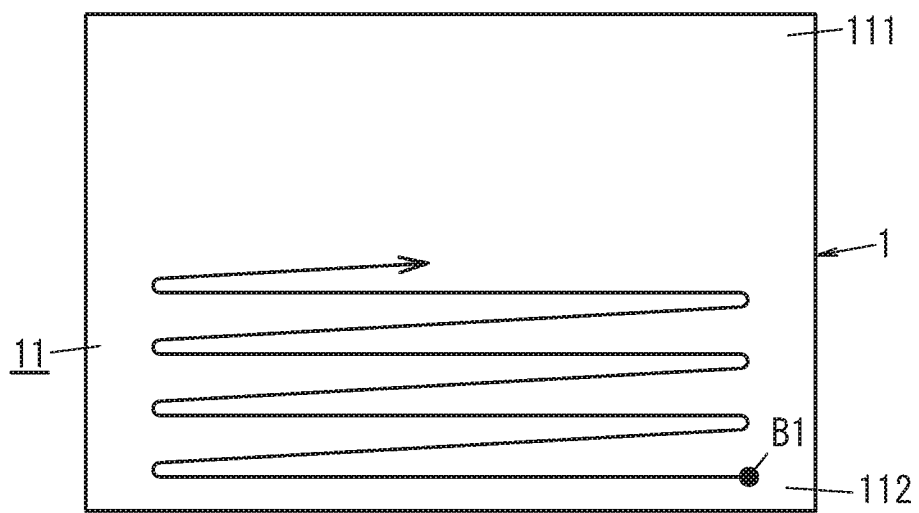
FIG. 4B schematically illustrates the movement of the beam spot on the screen for the outward path in the display system.

The scanning unit 32 moves the beam spot B1, formed on the surface 11 of the screen 1, laterally one-dimensionally to form a scan line, and also moves the beam spot B1 longitudinally, thus forming a two-dimensional image as shown in FIGS. 4A and 4B. The scanning unit 32 moves the beam spot B1 back and forth between two longitudinal ends of the screen 11 while performing these operations repeatedly. FIG. 4A schematically illustrates the movement of the beam spot B1 on the surface 11 of the screen 1 for one leg of the longitudinal scan, i.e., for the homeward path on which the surface 11 of the screen 1 is scanned from the first end 111 toward the second end 112. FIG. 4B schematically illustrates the movement of the beam spot B1 on the surface 11 of the screen 1 for the other leg of the longitudinal scan, i.e., for the outward path on which the surface 11 of the screen 1 is scanned from the second end 112 toward the first end 111. As used herein, "one leg" of the longitudinal scan refers to scanning the screen 1 longitudinally with the beam spot B1 from one longitudinal end of the screen 1 through the other longitudinal end thereof (i.e., either from the upper end of the screen 1 through the lower end thereof, or vice versa) while moving the beam spot B1 laterally on the screen 1 back and forth between one lateral end of the screen 1 and the other lateral end thereof (i.e., from the left end of the screen 1 through the right end thereof and vice versa).

That is to say, in this embodiment, the operating state of the irradiation unit 3 includes a first scanning state for the homeward path and a second scanning state for the outward path. The first scanning state is the operating state of scanning the surface 11 of the screen 1 from the first end 111 toward the second end 112. The second scanning state is the operating state of scanning the surface 11 of the screen 1 from the second end 112 toward the first end 111. In other words, the projection unit 40 alternately performs first scanning of scanning the screen 1 with the light beam from the first end 111 toward the second end 112 and second scanning of scanning the screen 1 with the light beam from the second end 112 toward the first end 111.

The scanning unit 32 includes a miniature scanning mirror that utilizes the microelectromechanical systems (MEMS) technology, for example. This scanning unit 32 includes a mirror unit for reflecting the laser beam and reflects the light beam, coming from the light source 31, in a direction determined by the angle of rotation (i.e., a twist angle) of the mirror unit by rotating the mirror unit. In this manner, the scanning unit 32 scans the surface 11 with the light beam coming from the light source 31. The scanning unit 32 performs the raster scan of scanning the object two-dimensionally with the light beam by rotating the mirror unit around two axes that intersect with each other at right angles.

The scanning unit 32 further includes a first lens and a second lens. The first lens is arranged between the light source 31 and the mirror unit and makes a parallel light beam incident onto the mirror unit. The second lens is implemented as a telecentric lens and arranged between the mirror unit and the screen 1. That is to say, the second lens is an optical system that makes the principal ray parallel to the optical axis over the entire lens. Thus, the light beam passing through the second lens goes out of the lens parallel to the optical axis (represented by a line that connects the second lens and the screen 1 together).

The projection optical system 4 receives, as an incident light beam, the light beam that been emitted from the irradiation unit 3 and transmitted through the screen 1, and projects the virtual image 300 (see FIG. 1) onto the target space 400 (see FIG. 1) with the incident light beam. In this embodiment, the projection optical system 4 is arranged beside the screen 1 in the movement direction X of the screen 1, and projects the virtual image 300 with the light beam that has been transmitted through the screen 1 to go out of the screen 1 in the movement direction X. The projection optical system 4 includes a magnifying lens 41, a first mirror 42, and a second mirror 43 as shown in FIG. 3.

The magnifying lens 41, the first mirror 42, and the second mirror 43 are arranged in this order along the optical path of the light beam transmitted through the screen 1. The magnifying lens 41 is arranged opposite from the irradiation unit 3 in the movement direction X (i.e., on one side, indicated by the arrow X1 showing the first direction, of the screen 1) with respect to the screen 1 such that the light beam transmitted through the screen 1 in the movement direction X1 is incident on the magnifying lens 41. The magnifying lens 41 magnifies the image produced on the screen 1 by the light beam emitted from the irradiation unit 3 and passes the magnified image to the first mirror 42. The first mirror 42 reflects the light beam coming from the magnifying lens 41 toward the second mirror 43. The second mirror 43 reflects the light beam coming from the first mirror 42 toward the windshield 101 (see FIG. 1). That is to say, the projection optical system 4 has the image, produced on the screen 1 by the light beam emitted from the irradiation unit 3, magnified by the magnifying lens 41 and then projected toward the windshield 101, thus projecting the virtual image 300 onto the target space 400. In this example, the optical axis of the magnifying lens 41 defines the optical axis 500 of the projection optical system 4.

The projection optical system 4 and the irradiation unit 3 together form the projection unit 40. In other words, the projection unit 40 includes the irradiation unit 3 and the projection optical system 4. Therefore, the optical axis of the magnifying lens 41, defining the optical axis 500 of the projection optical system 4 (and including an extension of the optical axis of a light beam reflected from a mirror, for example), also defines the optical axis 500 of the projection unit 40. The projection unit 40 renders an image on the screen 1 by irradiating the screen 1 with the light beam that scans the screen 1. Then, the projection unit 40 projects the virtual image 300 onto the target space 400 with the light beam transmitted through the screen 1.

The control circuit 5 controls the driving unit 2 and the irradiation unit 3. The control circuit 5 controls the driving unit 2 with a first control signal and also controls the irradiation unit 3 with a second control signal. The control circuit 5 is configured to synchronize the operation of the driving unit 2 with that of the irradiation unit 3. In this embodiment, the irradiation unit 3 includes the light source 31 and the scanning unit 32. The control circuit 5 controls both of the light source 31 and the scanning unit 32 with the second control signal.

The control circuit 5 performs the function of a drive control unit 51 as shown in FIG. 3. The control circuit 5 receives, for example, a signal from a driver assistance system installed in the automobile 100 to determine the content of the virtual image 300 to project.

The drive control unit 51 controls the driving unit 2 to have the screen 1 moved with respect to a home position. In other words, the drive control unit 51 has the screen 1 moved in the movement direction X. As used herein, the "home position" is set at a predetermined position within the movable range of the screen 1. The drive control unit 51 has the screen 1 moved to project the first virtual image 301 onto the target space 400 with the light beam transmitted through the screen 1 and controls the driving unit 2 in synchronization with the irradiation unit's 3 rendering an image on the screen 1.

In this embodiment, the drive control unit 51 controls the driving unit 2 so as to move the screen 1 intermittently or discontinuously. In addition, the drive control unit 51 also performs recovery processing of bringing the screen 1 back to its home position every time the screen 1 is moved. In this manner, the drive control unit 51 has the screen 1 moved with respect to the home position while performing an open loop control on the driving unit 2. Nevertheless, the position of the screen 1 that has gone through the recovery processing tends to vary. Therefore, the drive control unit 51 may also be configured to correct the "home position" that is the position of the screen 1 that has gone through the recovery processing.

The control circuit 5 may be implemented as a microcomputer including a processor and a memory. That is to say, the control circuit 5 is implemented as a computer system including a processor and a memory. In other words, the computer system performs the function of the control circuit 5 (drive control unit 51) by making the processor execute an appropriate program. The program may be stored in advance in either the memory or may also be downloaded via a telecommunications line such as the Internet or distributed after having been stored on a non-transitory storage medium such as a memory card.

The detection device 6 may be implemented as a laser imaging detection and ranging (LiDAR) sensor, a camera, a gyrosensor, or any other suitable type of sensor. The detection device 6 detects the tilt angle $\varphi 1$ (see FIG. 5) defined by the projection plane 600 (see FIG. 5) with respect to the reference plane 601. The detection device 6 outputs data about the tilt angle $\varphi 1$ as the result of detection to the control circuit 5.

(3) Operation (3.1) Basic Operation

First, the basic operation of the display system 10 according to this embodiment will be described.

The control circuit 5 controls the irradiation unit 3 to irradiate the screen 1 with the light beam coming from the irradiation unit 3. At this time, the screen 1 is irradiated by the irradiation unit 3 with a light beam that scans the surface 11 of the screen 1. This allows an image to be formed (or projected) on either the surface 11 or the back surface 12 of the screen 1. In this embodiment, the surface 11 of the screen 1 may have a light diffusion property, for example, and therefore, the image is formed on the surface 11 of the screen 1. Furthermore, the light beam coming from the irradiation unit 3 is transmitted through the screen 1 and then projected from the projection optical system 4 toward the windshield 101. This allows the image produced on the screen 1 to be projected toward the windshield 101 from under the windshield 101 inside of the vehicle cabin of the automobile 100.

When the image is projected from the projection optical system 4 toward the windshield 101, the windshield 101 reflects the light beam coming from the projection optical system 4 toward the user 200 (i.e., the driver) in the vehicle cabin. This allows the user 200 to visually recognize the image reflected from the windshield 101. Consequently, the user 200 visually recognizes, through the windshield 101, the virtual image 300 (which may be either the first virtual image 301 or the second virtual image 302) projected toward the space in front (and outside) of the automobile 100.

In addition, the control circuit 5 makes the drive control unit 51 control the driving unit 2 to move the screen 1 in the movement direction X. Moving the screen 1 in the first direction X1 in a situation where the beam spot B1 stays at the same location on the surface 11 of the screen 1 makes the distance from the user's 200 eyes (hereinafter referred to as an "eye point Pe1") to the virtual image 300 (hereinafter referred to as a "viewing distance") shorter. Conversely, moving the screen 1 in the second direction X2 in a situation where the beam spot B1 stays at the same location on the surface 11 of the screen 1 makes the viewing distance to the virtual image 300 longer. In short, the viewing distance to the virtual image 300 varies according to the position of the screen 1 in the movement direction X. The closer to the irradiation unit 3 the screen 1 is, the longer the viewing distance to the virtual image 300, projected in accordance with the beam spot B1 on the screen 1, becomes. In other words, the farther away from the projection optical system 4 in the movement direction X1 the beam spot formed on the screen 1 by the light beam coming from the irradiation unit 3 1 is, the longer the viewing distance to the virtual image 300, projected by this light beam, becomes.

(3.2) Specific Display Operation

Next, it will be described specifically how the display system 10 according to this embodiment operates to project the virtual image 300.

In projecting the first virtual image 301, the control circuit 5 has the screen 1 moved in the movement direction X (see FIG. 3) while making the irradiation unit 3 irradiate the screen 1 with the light beam. That is to say, the control circuit 5 controls the driving unit 2 and the irradiation unit 3 such that the irradiation unit 3 irradiates the screen 1 moving with the light beam. The screen 1 is generally perpendicular to the movement direction X. Thus, while the screen 1 is fixed, the distance to the projection optical system 4 in the movement direction X does not vary according to the longitudinal location on the surface 11 of the screen 1. In other words, moving the screen 1 in the movement direction X causes the beam spot formed on the surface 11 of the screen 1 by the light beam coming from the irradiation unit 3 to move longitudinally. This allows the beam spot formed on the surface 11 of the screen 1 by the light beam coming from the irradiation unit 3 to move in the movement direction X, thus forming (or projecting), on the screen 1, an image corresponding to the first virtual image 301. Projecting this image from the projection optical system 4 toward the windshield 101 allows the user 200 to visually recognize, through the windshield 101, the first virtual image 301 projected toward the space in front of the automobile 100.

For example, when the beam spot formed on the surface 11 of the screen 1 by the light beam coming from the irradiation unit 3 moves longitudinally toward the first end 111, moving the screen 1 in the second direction X2 makes longer the distance from the projection optical system 4 to the beam spot in the movement direction X. This increases the viewing distance to the virtual image 300 projected by this light beam. Conversely, when the beam spot formed on the surface 11 of the screen 1 by the light beam coming from the irradiation unit 3 moves longitudinally toward the second end 112, moving the screen 1 in the first direction X1 makes shorter the distance from the projection optical system 4 to the beam spot in the movement direction X. This decreases the viewing distance to the virtual image 300 projected by this light beam. Consequently, the first virtual image 301 is formed as the virtual image 300 on the first virtual plane 501 that forms a tilt angle α with respect to the optical axis 500.

On the other hand, in projecting the second virtual image 302 (or the third virtual image 303), the control circuit 5 makes the screen 1 fixed in the movement direction X, without allowing the screen 1 to move in the movement direction X, while making the irradiation unit 3 irradiate the screen 1 with the light beam. That is to say, the control circuit 5 controls the driving unit 2 and the irradiation unit 3 such that the irradiation unit 3 irradiates the screen 1 at the fixed position with the light beam. The screen 1 is generally perpendicular to the movement direction X. Thus, the distance in the movement direction X from the surface 11 of the screen 1 to the projection optical system 4 is substantially constant, irrespective of the longitudinal location on the surface 11 of the screen 1. This allows an image corresponding to the second virtual image 302 (or the third virtual image 303) to be formed (or projected) on the screen 1. Projecting this image from the projection optical system 4 onto the windshield 101 allows the user 200 to visually recognize, through the windshield 101, the second virtual image 302 (or the third virtual image 303) projected onto the space in front of the automobile 100.

For example, if the beam spot formed on the surface 11 of the screen 1 by the light beam coming from the irradiation unit 3 moves longitudinally toward the first end 111, the distance in the movement direction X from the projection optical system 4 to the beam spot becomes substantially constant, since the screen 1 is fixed. Conversely, if the beam spot formed on the surface 11 of the screen 1 by the light beam coming from the irradiation unit 3 moves longitudinally toward the second end 112, the distance in the movement direction X from the projection optical system 4 to the beam spot becomes substantially constant, since the screen 1 is fixed. Consequently, the second virtual image 302 (or the third virtual image 303) is formed as the virtual image 300 on the second virtual plane 502 that forms a tilt angle β (of, for example, 90 degrees) with respect to the optical axis 500.

The display system 10 according to this embodiment has the ability to project all of the first virtual image 301, the second virtual image 302, and the third virtual image 303 in one cycle during which the scanning unit 32 completes a longitudinal scan, in two legs, of the screen 1. Specifically, one longitudinal scan of the screen 1 consists of one leg starting with one end of the screen 1 and ending with the other end of the screen 1, and the other leg starting with the other end of the screen 1 and ending with the one end of the screen 1). Suppose, in this example, the first virtual image 301, the second virtual image 302, and the third virtual image 303 are projected in this order while the scanning unit 32 makes a longitudinal scan, in two legs, of the screen 1 that starts with the second end 112 of the screen 1. Specifically, for the outward path in which the screen 1 is scanned from the second end 112 toward the first end 111, the projection unit 40 projects the first virtual image 301 by irradiating the screen 1 with the light beam. Then, for the homeward path in which the screen 1 is scanned from the first end 111 toward the second end 112, the projection unit 40 projects the second virtual image 302 and the third virtual image 303 by irradiating the screen 1 with the light beam.

Thus, while the beam spot formed on the surface 11 of the screen 1 by the light beam coming from the irradiation unit 3 is making a longitudinal scan, in two legs, of the screen 1, the first virtual image 301, the second virtual image 302, and the third virtual image 303 are projected onto the target space 400. Making the irradiation unit 3 complete this longitudinal scan relatively quickly allows the user 200 to visually recognize the first virtual image 301, the second virtual image 302, and the third virtual image 303, as if these virtual images 301, 302, and 303 were presented simultaneously. The frequency of the longitudinal scan by the irradiation unit 3 may be equal to or higher than 60 Hz, for example.

(3.3) Drive Control Unit (3.3.1) First Exemplary Operation

First, a first exemplary operation of the drive control unit 51 in the display system 10 according to this embodiment will be described with reference to FIGS. 5A, 5B, 6, and 7.

In FIGS. 5A and 5B, the reference sign 601 designates a road surface on which the automobile 100 travels and is a flat surface (hereinafter referred to as a "first road surface 601"). In FIGS. 5A and 5B, the reference sign 602 designates another road surface on which the automobile 100 travels and is an ascending slope that upwardly slopes away from the first road surface 601 as a reference plane with respect to the vertical line (hereinafter referred to as a "second road surface 602"), as the distance from the current location of the automobile 100 increases. Specifically, the second road surface 602 defines a tilt angle $\varphi 11$ with respect to the first road surface 601 as the reference plane (hereinafter referred to as a "reference plane 601"). In FIGS. 5A and 5B, the reference sign 603 designates still another road surface on which the automobile 100 travels and is a descending slope that downwardly slopes away from the first road surface 601 with respect to the vertical line (hereinafter referred to as a "third road surface 603"), as the distance from the current location of the automobile 100 increases. Specifically, the third road surface 603 defines a tilt angle $\varphi 12$ with respect to the reference plane 601. In FIGS. 5A and 5B, the reference sign 604 designates yet another road surface on which the automobile 100 travels and is a descending slope that downwardly slopes away from the first road surface 601 with respect to the vertical line (hereinafter referred to as a "fourth road surface 604"), as the distance from the current location of the automobile 100 increases. Specifically, the fourth road surface 604 defines a tilt angle $\varphi 13$ with respect to the reference plane 601. The tilt angle $\varphi 13$ of the fourth road surface 604 is larger than the tilt angle $\varphi 12$ of the third road surface 603. Note that the reference signs P11-P14, P23-P26, P33, P43, and P44 in FIG. 4B each designate the beam spot formed by the light beam coming from the irradiation unit 3.

In the following description, the first to fourth road surfaces 601-604 will be collectively hereinafter referred to as "road surfaces 600" unless there is any special need to distinguish the first to fourth road surfaces 601-604 from each other. The first to fourth road surfaces 601-604 are each a projection plane on which the virtual image 300 is projected as well, and therefore, will also be hereinafter referred to as "first to fourth projection planes 601-604" as well. In the following description, the first to fourth projection planes 601-604 will be collectively hereinafter referred to as "projection planes 600" unless there is any special need to distinguish the first to fourth projection planes 601-604 from each other. That is to say, in this embodiment, the projection planes 600 are road surfaces. Furthermore, in the following description, the tilt angles $\varphi 11$-$\varphi 13$ will be collectively hereinafter referred to as "tilt angles $\varphi 1$" unless there is any special need to distinguish the tilt angles $\varphi 11$-$\varphi 13$ from each other.

Figure 6:
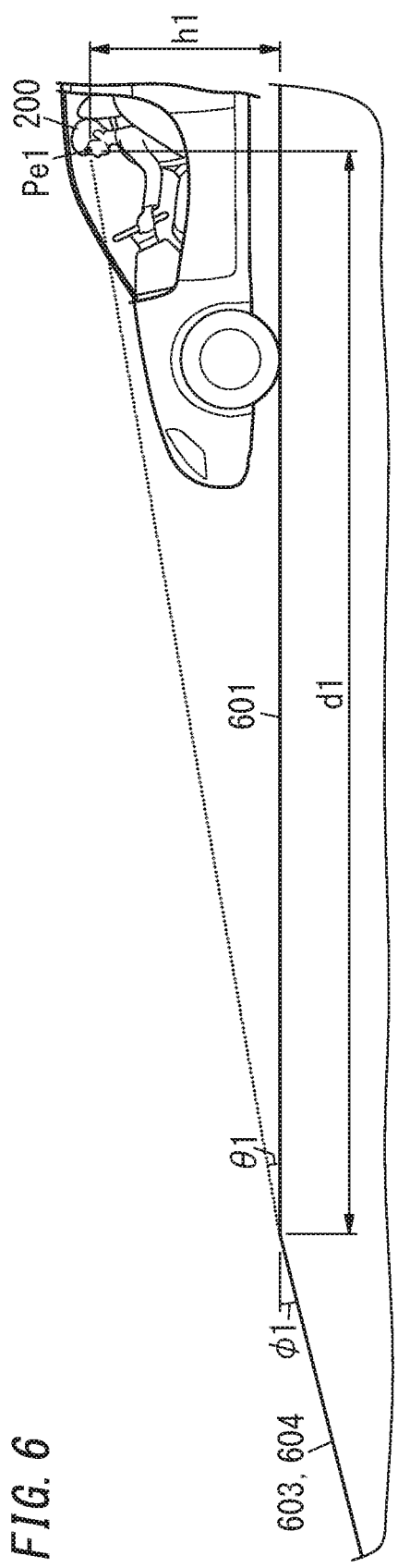
FIG. 6 illustrates how the display system operates in another situation.

In this case, a threshold value $\varphi$th for the tilt angle $\varphi 12$ of the third road surface 603 and the tilt angle $\varphi 13$ of the fourth road surface 604 with respect to the reference plane 601 may be calculated with reference to FIG. 6. In FIG. 6, the reference sign h1 designates the height of the user's 200 (driver's) eye point Pe1 as measured from the reference plane 601. Also, in FIG. 6, the reference sign d1 designates the distance from the user's 200 current location to a point where the third and fourth road surfaces 603 and 604 start to slope downward. Furthermore, in FIG. 6, the reference sign $\theta 1$ designates the tilt angle defined by the user's 200 eye point Pe1 with respect to the reference plane 601 when he or she views the point where the third and fourth road surfaces 603 and 604 start to slope downward. In this case, the threshold value $\varphi$th for the tilt angles $\varphi 12$ and $\varphi 13$ may be calculated by the following equation:

$$\varphi th=\theta 1=\alpha \tan(h1/d1)$$

That is to say, the road surface 600 is the third road surface 603 when the tilt angle $\varphi 1$ is smaller than $\theta 1$ and is the fourth road surface 604 when the tilt angle $\varphi 1$ is larger than $\theta 1$.

If the projection plane 600 is the second road surface 602, projecting the virtual image 300 onto the same position as the first road surface 601 would make the virtual image 300 appear to be sinking into the ground. On the other hand, if the projection plane 600 is either the third road surface 603 or the fourth road surface 604, projecting the virtual image 300 onto the same position as the first road surface 601 would make the virtual image 300 appear to be floating in the air. That is to say, if the projection plane 600 is any one of the second to fourth road surfaces 602-604, then the virtual image 300 would be projected unnaturally onto the projection plane 600. In other words, if the projection plane 600 is tilted with respect to the reference plane 601, the degree of matching between the projection plane 600 and the virtual image 300 projected onto the projection plane 600 would decrease.

Thus, in the display system 10 of this embodiment, the drive control unit 51 controls the position of the screen 1 so as to increase, even when the projection plane 600 is tilted with respect to the reference plane 601, the degree of matching between the projection plane 600 and the virtual image 300 projected onto the projection plane 600. In other words, the drive control unit 51 performs correction processing of having the screen 1 moved in the movement direction X such that an optical path leading to a rendering point on the screen 1 varies its length 201 (see FIG. 5A) according to the tilt angle $\varphi 1$ defined by the projection plane 600 with respect to the reference plane 601. Next, it will be described with reference to FIG. 7 how the drive control unit 51 operates. In the following description, the control of the screen 1 position by the drive control unit 51 will be referred to as "correction processing."

Figure 7:
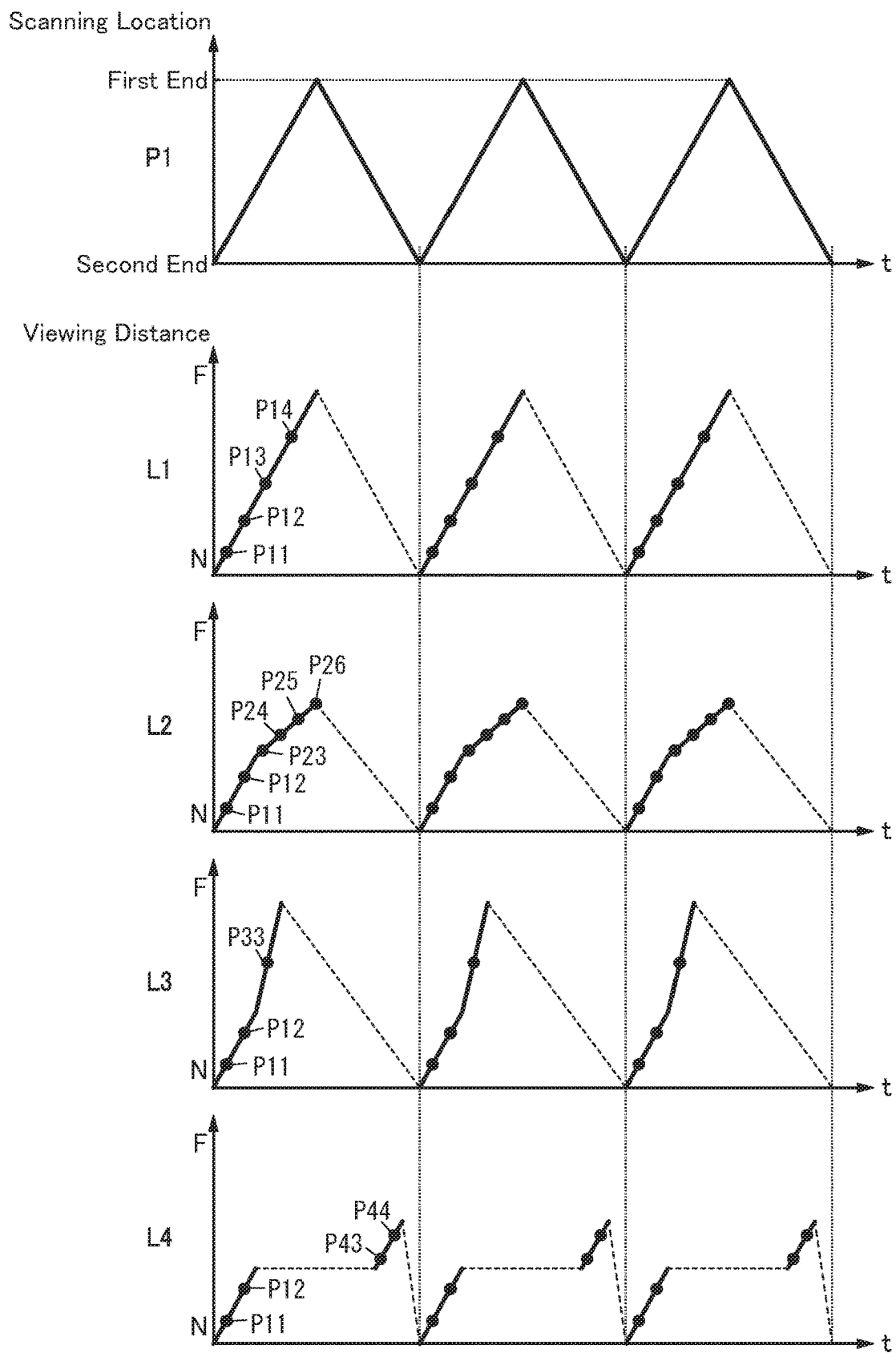
FIG. 7 is a graph showing a first exemplary operation of the display system.

In FIG. 7, the reference sign P1 designates the longitudinal location of the beam spot formed on the screen 1 at which the screen 1 is scanned by the scanning unit 32. In FIG. 7, the reference sign L1 designates the viewing distance to the virtual image 300 when the projection plane 600 is the first road surface 601. In FIG. 7, the reference sign L2 designates the viewing distance to the virtual image 300, when the projection plane 600 is the second road surface 602. In FIG. 7, the reference sign L3 designates the viewing distance to the virtual image 300 when the projection plane 600 is the third road surface 603. In FIG. 7, the reference sign L4 designates the viewing distance to the virtual image 300 when the projection plane 600 is the fourth road surface 604.

When the display system 10 performs this first exemplary operation, the drive wave for the scanning unit 32 may be a triangular wave as shown in FIG. 7, for example. For the outward path on which the screen 1 is scanned from the second end 112 toward the first end 111, the scanning location P1 by the scanning unit 32 monotonically rises longitudinally from the second end 112 toward the first end 111. On the other hand, for the homeward path on which the screen 1 is scanned from the first end 111 toward the second end 112, the scanning location P1 by the scanning unit 32 monotonically falls longitudinally from the first end 111 toward the second end 112.

When the projection plane 600 is the first road surface 601, the drive control unit 51 has the screen 1 moved in the movement direction X such that the beam spots formed on the surface 11 of the screen 1, and then projected onto the first road surface 601, by the light beam coming from the irradiation unit 3 are P11-P14 for the outward path.

When the projection plane 600 is the second road surface 602, the drive control unit 51 has the screen 1 moved in the movement direction X such that the beam spots formed on the surface 11 of the screen 1, and then projected onto the second road surface 602, by the light beam coming from the irradiation unit 3 are P11, P12, and P23-P26 for the outward path. In this case, when the projection plane 600 is the second road surface 602, the virtual image 300 is projected onto a point closer to the user 200 than when the projection plane 600 is the first road surface 601. Thus, for the beam spots P23-P26 corresponding to the second road surface 602, the drive control unit 51 has the screen 1 moved in the first direction X1 so as to shorten the viewing direction to the virtual image 300. This shortens the length 201 of the optical path leading from the windshield 101 to the projection plane 600 (the second projection plane 602 in this case). In other words, when the tilt angle φ1 is an angle of elevation, the drive control unit 51 has, during the correction processing, the screen 1 moved in the movement direction X such that the optical path has a shorter length 201 than when the virtual image 300 is projected onto the reference plane (first road surface) 601 as the projection plane 600. As used herein, the "angle of elevation" refers to an angle at which the difference in distance from the projection unit 40 between a proximal end located closer to the projection unit 40 and a distal end located more distant from the projection unit 40 is smaller, than when the virtual image 300 is projected onto the reference plane 601 to be described later.

When the projection plane 600 is the third road surface 603, the drive control unit 51 has the screen 1 moved in the movement direction X such that the beam spots formed on the surface 11 of the screen 1, and then projected onto the third road surface 603, by the light beam coming from the irradiation unit 3 are P11, P12, and P33 for the outward path. In this case, when the projection plane 600 is the third road surface 603, the virtual image 300 is projected onto a point more distant from the user 200 than when the projection plane 600 is the first road surface 601. Thus, for the beam spot P33 corresponding to the third road surface 603, the drive control unit 51 has the screen 1 moved in the second direction X2 so as to increase the viewing direction to the virtual image 300. This increases the length 201 of the optical path leading from the windshield 101 to the projection plane 600 (the third projection plane 603 in this case).

When the projection plane 600 is the fourth road surface 604, the drive control unit 51 has the screen 1 moved in the movement direction X such that the beam spots formed on the surface 11 of the screen 1, and then projected onto the fourth road surface 604, by the light beam coining from the irradiation unit 3 are P11 and P12 for the outward path. In addition, the drive control unit 51 also has the screen 1 moved in the movement direction X such that the beam spots formed on the surface 11 of the screen 1, and then projected onto the fourth road surface 604, by the light beam coming from the irradiation unit 3 are P43 and P44 for the homeward path. In this case, the beam spots P11 and P44 are the same scanning location, and the beam spots P12 and P43 are the same scanning location. That is to say, in this case, the same location is scanned twice for the outward path and the homeward path, respectively.

In the display system 10 performing this first exemplary operation, when the projection plane 600 is any of the second to fourth road surfaces 602-604, the drive control unit 51 has the screen 1 moved in the movement direction X such that the optical path length 201 varies according to the tilt angle φ11-φ13 defined by the projection plane 600 with respect to the reference plane 601. This allows, even when the projection plane 600 is tilted with respect to the reference plane 601, the virtual image 300 to be projected onto the projection plane 600. This increases the degree of matching between the projection plane 600 and the virtual image 300 projected onto the projection plane 600, compared to a situation where the screen 1 is not moved according to the tilt angle φ1.

In the display system 10 performing this first exemplary operation, when the projection plane 600 is any one of the first to third road surfaces 601-603, the drive control unit 51 performs the correction processing only for the outward path as shown in FIG. 7. However, this is only an example and should not be construed as limiting. Alternatively, the drive control unit 51 may perform the correction processing for both of the outward path and the homeward path. Still alternatively, the drive control unit 51 may perform the correction processing only for the homeward path. In other words, the drive control unit 51 may be configured to perform the correction processing during at least one of the first scanning or the second scanning.

(3.3.2) Second Exemplary Operation

Next, a second exemplary operation of the drive control unit 51 in the display system 10 according to this embodiment will be described with reference to FIG. 8.

The display system 10 performing this second exemplary operation is able to project, onto the projection plane 600, not only the first virtual image 301 to be visually recognized as having depth along the projection plane 600 but also the second virtual image 302 (or the third virtual image 303) to be visually recognized as an upright image perpendicular to the projection plane 600. In other words, the virtual image 300 includes the first virtual image 301 projected onto the projection plane 600 such that the first virtual image 301 is formed on a plane that is generally parallel to the projection plane 600 and the second virtual image 302 projected onto the projection plane 600 such that the second virtual image 302 crosses the projection plane 600.

Figure 8:
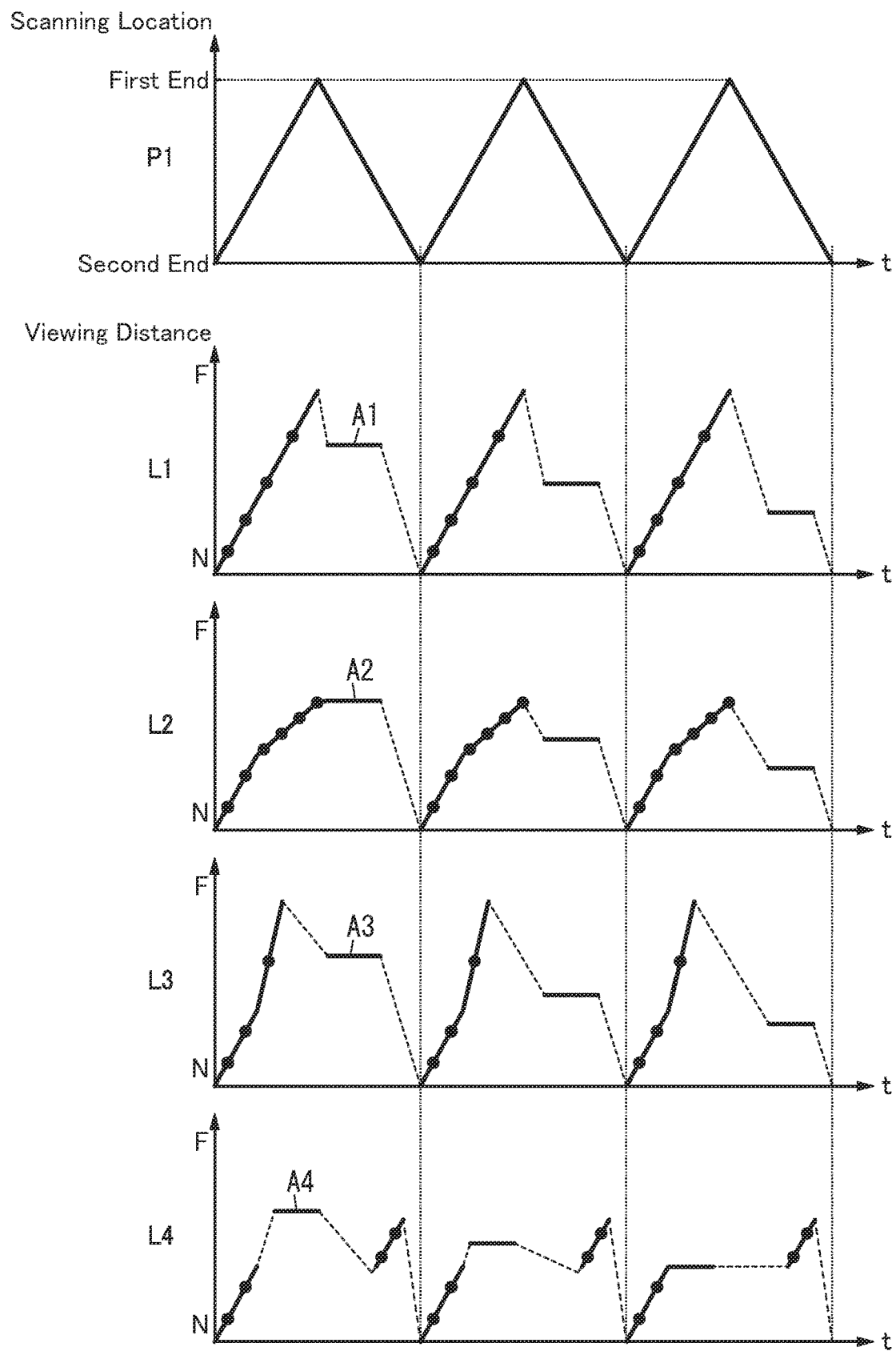
FIG. 8 is a graph showing a second exemplary operation of the display system.

In the example illustrated in FIG. 8, when the projection plane 600 is any one of the first to third road surfaces 601-603, the drive control unit 51 has the screen 1 moved in the movement direction X such that the first virtual image 301 is formed for the outward path. For the homeward path, on the other hand, the drive control unit 51 has the screen 1 fixed at a predetermined position in the movement direction X such that the second virtual image 302 is formed (see the lines A1-A3 shown in FIG. 8).

On the other hand, when the projection plane 600 is the fourth road surface 604, the drive control unit 51 has the screen 1 moved in the movement direction X such that the first virtual image 301 is formed for the outward path, and then has the screen 1 fixed at a predetermined position such that the second virtual image 302 is formed for the outward path (see the line A4 shown in FIG. 8). For the homeward path, on the other hand, the drive control unit 51 also has the screen 1 moved in the movement direction X such that the first virtual image 301 is formed.

In this case, FIG. 8 illustrates an exemplary situation where the second virtual image 302 comes gradually closer (i.e., the viewing distance to the second virtual image 302 decreases) with time.

The display system 10 performing this second exemplary operation is able to project the second virtual image 302 onto the projection plane 600 by temporarily fixing the screen 1 for either the outward path or the homeward path. That is to say, the display system 10 is able to project the first virtual image 301 and the second virtual image 302 onto the projection plane 600 simultaneously.

(3.3.3) Third Exemplary Operation

Next, a third exemplary operation of the drive control unit 51 in the display system 10 according to this embodiment will be described with reference to FIG. 9.

The display system 10 performing this third exemplary operation is able to project the virtual image 300 onto one road surface 600 for the outward path and onto another road surface 600 for the homeward path. In other words, the drive control unit 51 performs the correction processing during each of the first scanning (i.e., for the homeward path) and the second scanning (i.e., for the outward path).

Figure 9:
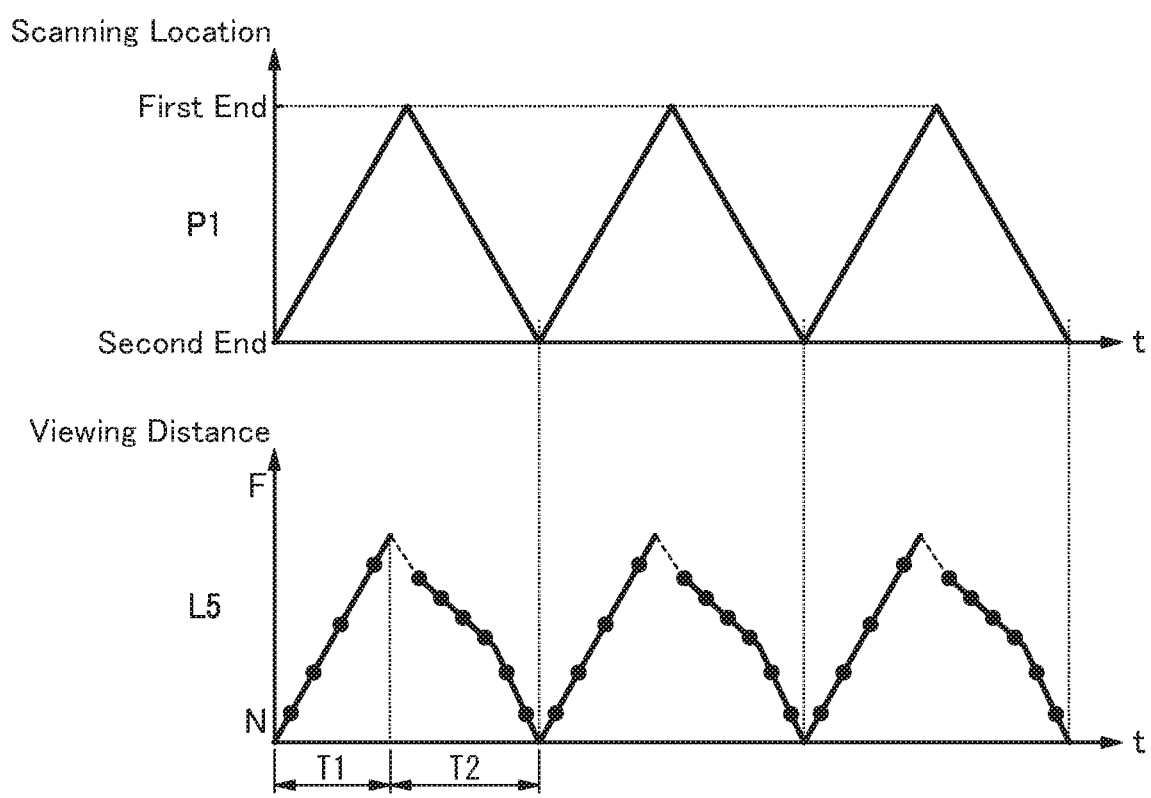
FIG. 9 is a graph showing a third exemplary operation of the display system.

The drive control unit 51 performs the correction processing of projecting the virtual image 300 onto the first road surface 601 during a first period T1 in which processing for the outward path is performed as shown in FIG. 9. In addition, the drive control unit 51 performs the correction processing of projecting the virtual image 300 onto the second road surface 602 during a first period T2 in which processing for the homeward path is performed as shown in FIG. 9. That is to say, the drive control unit 51 is configured to perform two different types of correction processing for the outward path and the homeward path, respectively. This allows the virtual image 300 to be projected simultaneously on the driving lane and the ramp way of a highway, for example.

That is to say, the display system 10 performing this third exemplary operation is able to project the virtual image 300 on a plurality of road surfaces 600 with different grades simultaneously by making the drive control unit 51 perform two different types of correction processing for the outward path and the homeward path, respectively.

(3.3.4) Fourth Exemplary Operation

Next, a fourth exemplary operation of the drive control unit 51 in the display system 10 according to this embodiment will be described with reference to FIG. 10.

In the display system 10 performing this fourth exemplary operation, the drive control unit 51 performs the correction processing for a situation where the projection plane 600 is the first road surface 601 for the outward path, and performs the correction processing for a situation where the projection plane 600 is any one of the second to fourth road surfaces 602-604 for the homeward path.

The display system 10 performing this fourth exemplary operation allows the drive control unit 51 to perform the drive control more easily, compared to a situation where the two types of correction processing are performed for either the outward path or the homeward path.

(3.3.5) Fifth Exemplary Operation

Next, a fifth exemplary operation of the drive control unit 51 in the display system 10 according to this embodiment will be described with reference to FIGS. 11 and 12.

Figure 11:
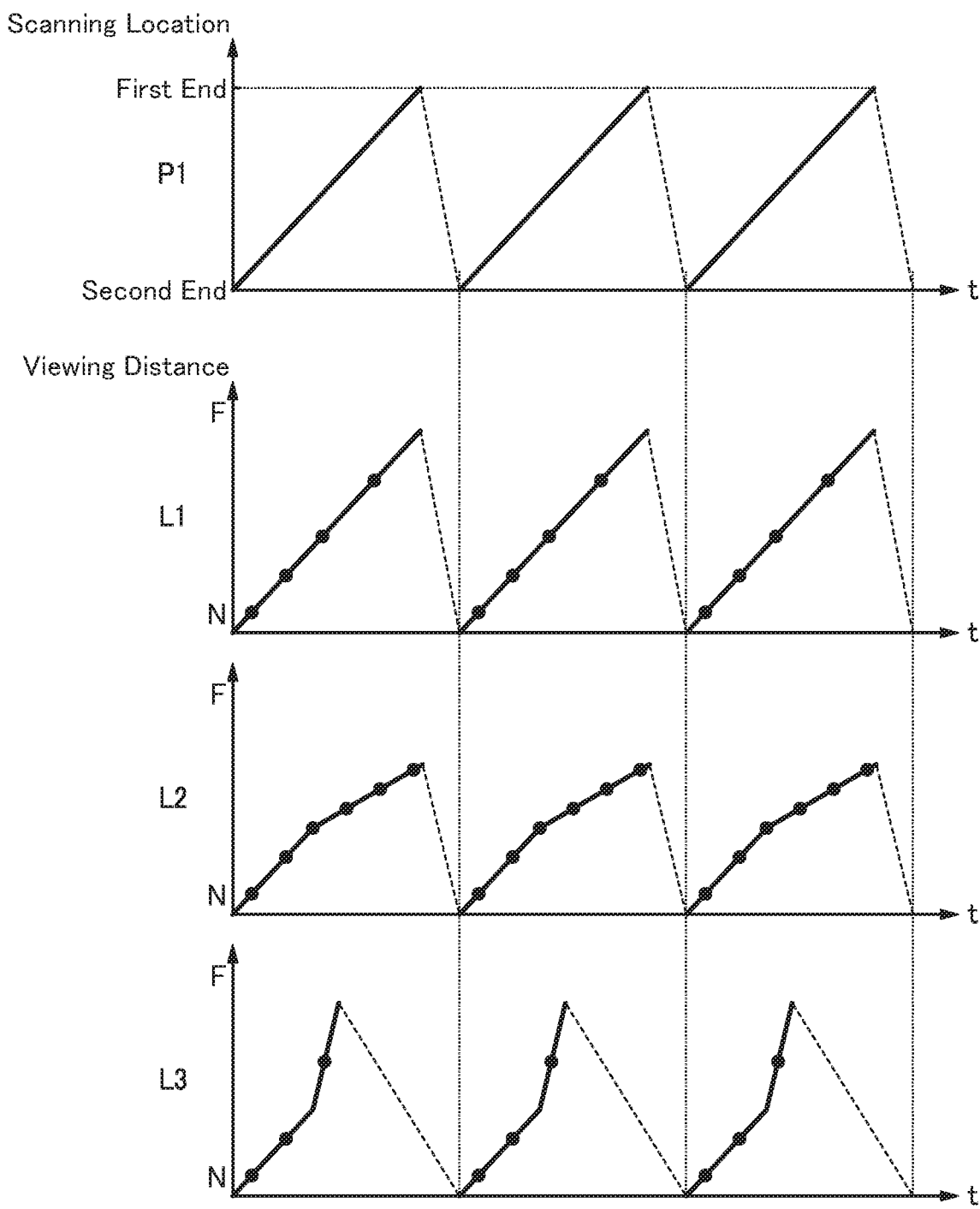
FIG. 11 is a graph showing a fifth exemplary operation of the display system.
Figure 12:
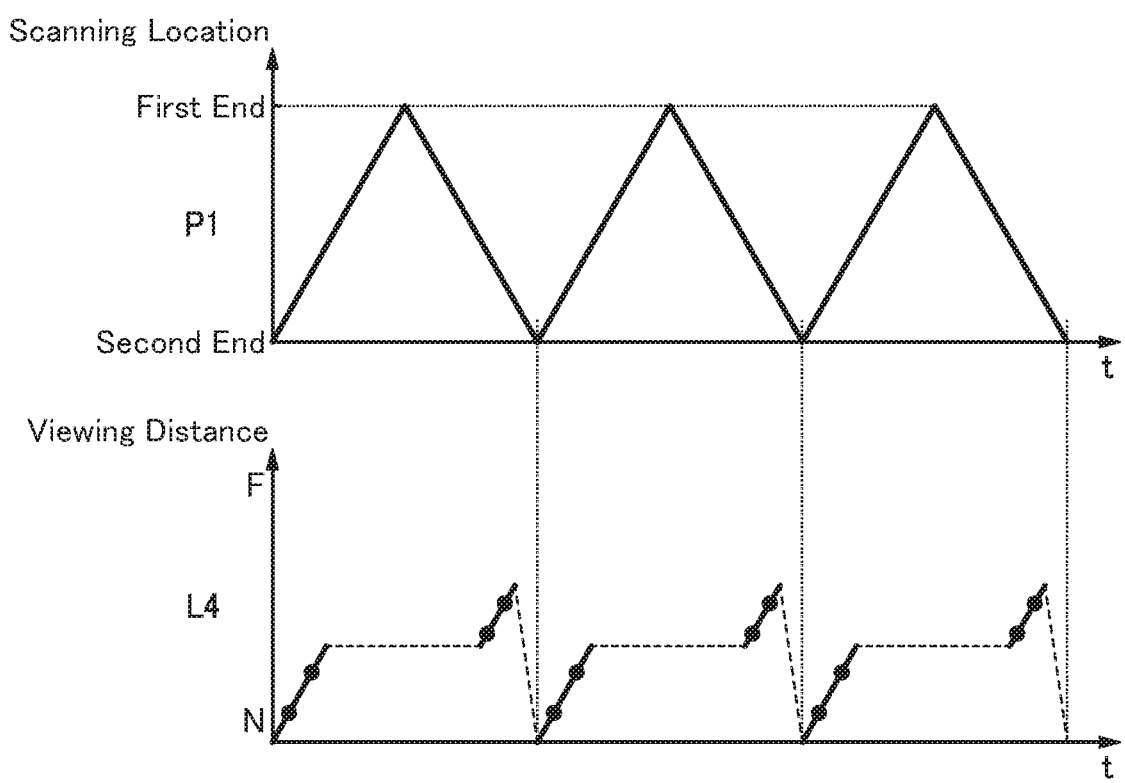
FIG. 12 is a graph showing the fifth exemplary operation of the display system.

In the display system 10 performing this fifth exemplary operation, when the projection plane 600 is any one of the first to third road surfaces 601-603, the drive wave for the scanning unit 32 may have a saw-tooth waveform as shown in FIG. 11. On the other hand, when the projection plane 600 is the fourth road surface 604, the drive wave for the scanning unit 32 may have a triangular waveform as shown in FIG. 12.

When the projection plane 600 is the fourth road surface 604, the same location needs to be scanned twice for the outward path and for the homeward path, respectively, and therefore, the drive wave for the scanning unit 32 suitably has a triangular waveform that is symmetric between the outward path and the homeward path. On the other hand, when the projection plane 600 is any one of the first to third road surfaces 601-603, scanning needs to be made for either the outward path or the homeward path, and therefore, the drive wave for the scanning unit 32 suitably has a saw-tooth waveform. This allows the scanning unit 32 to extend the scanning duration for either the outward path or the homeward path. Nevertheless, the scanning cycle remains the same for the lateral direction. Consequently, this increases the number of times of lateral scanning for either the outward path or the homeward path, thus increasing the resolution of the virtual image 300.

(3.3.6) Sixth Exemplary Operation

Figure 13:
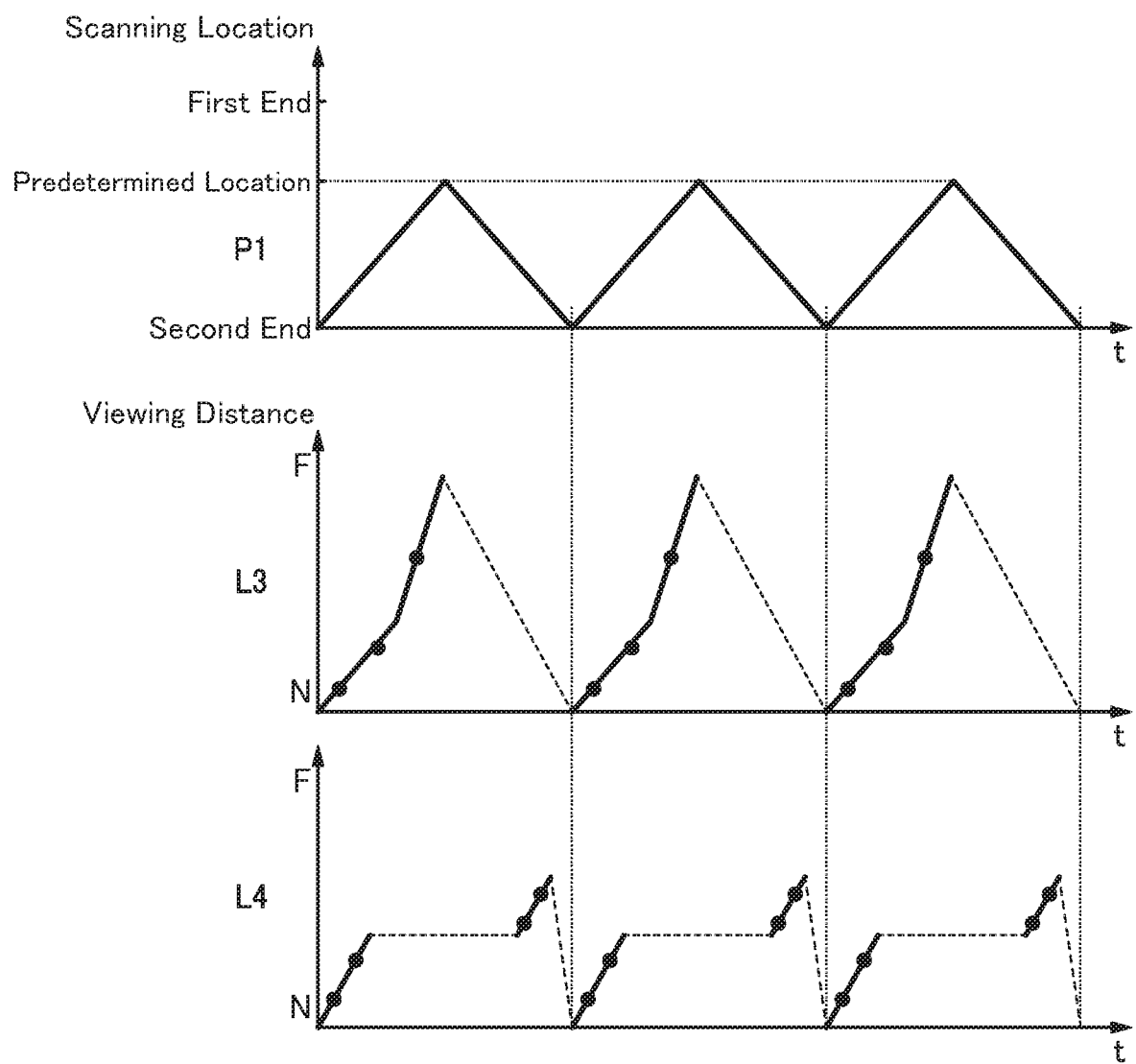
FIG. 13 is a graph showing a sixth exemplary operation of the display system.

Next, a sixth exemplary operation of the drive control unit 51 in the display system 10 according to this embodiment will be described with reference to FIG. 13.

When the projection plane 600 is either the third road surface 603 or the fourth road surface 604, no virtual images 300 are projected onto any plane located over the first road surface 601, and therefore, the scanning unit 32 does not need to scan the screen 1 through the first end 111 that is the top end of the screen 1. In that case, the scanning unit 32 may scan the screen 1 through a predetermined location closer to the second end 112 than to the first end 111 for the outward path as shown in FIG. 13. In other words, when the tilt angle φ1 is an angle of depression, the projection unit 40 may finish performing the second scanning, and start performing the first scanning instead, at the predetermined location loser to the second end 112 than to the first end 111.

The display system 10 performing this sixth exemplary operation is able to narrow the longitudinal scanning range of the screen 1, compared to a situation where the screen 1 is scanned from the second end 112 through the first end 111 for the outward path (i.e., the second scanning). Nevertheless, the overall amount of time for scanning remains the same, and therefore, the number of times of lateral scanning remains unchanged. This increases the scanning density and eventually increases the resolution of the virtual image 300 as well.

(3) Variations

The embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the display system 10 may be implemented as a method for controlling the display system 10, a computer program, or a non-transitory storage medium that stores the computer program thereon, for example.

A method for controlling a display system 10 according to an aspect is designed to control a display system 10 including a screen 1, a drive control unit 51, and a projection unit 40. The screen 1 is movable in a movement direction X. The drive control unit 51 has the screen 1 moved in the movement direction X. The projection unit 40 renders an image on the screen 1 by irradiating the screen 1 with a light beam that scans the screen 1 and projects a virtual image 300 onto a projection plane 600 with the light beam transmitted through the screen 1. The method for controlling the display system 10 includes making the drive control unit 51 perform correction processing. The correction processing includes having the screen 1 moved in the movement direction X such that an optical path leading to a rendering point on the screen 1 varies its length 201 according to a tilt angle φ1 defined by the projection plane 600 with respect to a reference plane 601.

A non-transitory storage medium that stores thereon a program according to another aspect is designed to make a computer system execute the method for controlling the display system 10 described above.

Next, variations of the embodiment described above will be enumerated one after another. Note that any of the variations to be described below may be combined as appropriate.

The agent that implements the display system 10 or executes the method for controlling the display system 10 according to the present disclosure includes a computer system. The computer system includes, as principal hardware components, a processor and a memory. The functions of the agent that implements the display system 10 or executes the method for controlling the display system 10 according to the present disclosure are performed by making the processor execute the program stored in the memory of the computer system. The program may be stored in advance in the memory of the computer system. Alternatively, the program may also be downloaded through a telecommunications line or be distributed after having been stored in some computer-readable non-transitory storage medium. Examples of the computer-readable non-transitory storage media include a memory card, an optical disc, and a hard disk drive. The processor of the computer system is made up of a single or a plurality of electronic circuits including a semiconductor integrated circuit (IC) or a largescale integrated circuit (LSI). Those electronic circuits may be integrated together on a single chip or distributed on multiple chips without limitation. Those multiple chips may be integrated together in a single device or distributed in multiple devices without limitation.

Also, some function of the control circuit 5 (including the drive control unit 51) of the display system 10 may also be implemented in a single device or distributed in a plurality of devices. Furthermore, at least some functions of the control circuit 5 (including the drive control unit 51) may be implemented as a cloud computing system as well.

In the embodiment described above, the tilt angle φ1 defined by the projection plane 600 with respect to reference plane 601 is detected by the detection device 6. However, this is only an example and should not be construed as limiting. Alternatively, information about the tilt angle φ1 may be acquired from a navigation system installed in the automobile 100, for example.

Also, in the embodiment described above, the screen 1 is parallel to the plane 503 that is perpendicular to the movement direction X of the screen 1. However, this is only an example and should not be construed as limiting. Alternatively, the screen 1 may be tilted with respect to the plane 503. In that case, even when the screen 1 is fixed, the distance in the movement direction X to the projection optical system 4 varies according to the longitudinal location on the surface 11 of the screen 1. Thus, the beam spot formed on the surface 11 of the screen 1 by the light beam coming from the irradiation unit 3 shifts in the movement direction X. This allows, with the screen 1 fixed, an image corresponding to the first virtual image 301 to be formed (or projected) onto the screen 1.

Furthermore, in the embodiment described above, the screen is implemented as only the screen 1 movable in the movement direction X. However, this is only an example and should not be construed as limiting. Optionally, the screen may include a fixed screen and a movable screen.

Furthermore, in the embodiment described above, the display system 10 is implemented as a head-up display. However, this is only an example and should not be construed as limiting. Alternatively, the display system 10 may also be implemented as a head mounted display (HMD) designed to be worn by the user 200 over his or her head.

Furthermore, in the embodiment described above, the automobile 100 is supposed to travel from the first road surface 601 as a flat surface to the third or fourth road surface 603, 604 as the surface of a descending slope. However, the same statement applies to even a situation where the first road surface 601 is the surface of an ascending slope and the automobile 100 travels from the first road surface 601 to the third or fourth road surface 603, 604.

In the first exemplary operation of the embodiment described above, the drive control unit 51 performs the correction processing for only the outward path. However, this is only an example and should not be construed as limiting. Alternatively, the drive control unit 51 may perform the correction processing for each of the outward path and the homeward path. This aspect increases the luminance of the virtual image 300 by having the same location scanned twice for the outward path and the homeward path, respectively.

(Resume)

As can be seen from the foregoing description, a display system (10) according to a first aspect includes a screen (1), a drive control unit (51), and a projection unit (40). The screen (1) is movable in a movement direction (X). The drive control unit (51) has the screen (1) moved in the movement direction (X). The projection unit (40) renders an image on the screen (1) by irradiating the screen (1) with a light beam that scans the screen (1) and projects a virtual image (300) onto a projection plane (600) with the light beam transmitted through the screen (1). The drive control unit (51) performs correction processing of having the screen (1) moved in the movement direction (X) such that an optical path leading to a rendering point on the screen (1) varies its length (201) according to a tilt angle (φ1) defined by the projection plane (600) with respect to a reference plane (601).

According to this aspect, the screen (1) is moved in the movement direction (X) according to the tilt angle (φ1) defined by the projection plane (600) with respect to the reference plane (601). This increases the degree of matching between the projection plane (600) and the virtual image (300) projected onto the projection plane (600), compared to a situation where the screen (1) is not moved. That is to say, this aspect increases, even when the projection plane (600) is tilted with respect to the reference plane (601), the degree of matching between the projection plane (600) and the virtual image (300) projected onto the projection plane (600).

In a display system (10) according to a second aspect, which may be implemented in conjunction with the first aspect, the projection plane (600) is a road surface (such as first to fourth road surfaces 601-604).

This aspect increases the degree of matching between a road surface as the projection plane (600) and the virtual image (300) projected onto the road surface.

In a display system (10) according to a third aspect, which may be implemented in conjunction, with the second aspect, the drive control unit (51) has, during the correction processing, the screen (1) moved in the movement direction (X) such that when the tilt angle ($\varphi 1$) is an angle of elevation, the optical path has a shorter length (201) than when the virtual image (300) is projected onto the reference plane (601) as the projection plane (600).

This aspect brings, when the tilt angle ($\varphi 1$) is an angle of elevation, the projection plane (600) toward the projection unit (40). Thus, moving the screen (1) so as to shorten the optical path length (201) increases the degree of matching between the projection plane (600) and the virtual image (300) projected onto the projection plane (600).

In a display system (10) according to a fourth aspect, which may be implemented in conjunction with any one of the first to third aspects, the screen (1) has a first end (111) and a second end (112). The first end (111) corresponds to a distal end, located more distant from the projection unit (40), of the reference plane (601). The second end (112) corresponds to a proximal end, located closer to the projection unit (40), of the reference plane (601). The projection unit (40) alternately performs first scanning (for the homeward path) and second scanning (for the outward path). In the first scanning, a beam spot formed on the screen (1) by the light beam moves from the first end (111) toward the second end (112). In the second scanning, the beam spot formed on the screen (1) by the light beam moves from the second end (112) toward the first end (111). The drive control unit (51) performs the correction processing during either the first scanning or the second scanning.

This increases the degree of matching between the projection plane (600) and the virtual image (300) projected onto the projection plane (600) while shortening the amount of time it takes to perform the correction processing, compared to a situation where the correction processing is performed during each of the first scanning and the second scanning.

In a display system (10) according to a fifth aspect, which may be implemented in conjunction with any one of the first to third aspects, the screen (1) has a first end (111) and a second end (112). The first end (111) corresponds to a distal end, located more distant from the projection unit (40), of the reference plane (601). The second end (112) corresponds to a proximal end, located closer to the projection unit (40), of the reference plane (601). The projection unit (40) alternately performs first scanning (for the homeward path) and second scanning (for the outward path). In the first scanning, a beam spot formed on the screen (1) by the light beam moves from the first end (111) toward the second end (112). In the second scanning, the beam spot formed on the screen (1) by the light beam moves from the second end (112) toward the first end (111). The drive control unit (51) performs the correction processing during each of the first scanning and the second scanning.

This aspect allows different types of correction processing to be performed during the first scanning and the second scanning, respectively.

In a display system (10) according to a sixth aspect, which may be implemented in conjunction with any one of the first to fifth aspects, the screen (1) has a first end (111) and a second end (112). The first end (111) corresponds to a distal end, located more distant from the projection unit (40), of the reference plane (601). The second end (112) corresponds to a proximal end, located closer to the projection unit (40), of the reference plane (601). The projection unit (40) alternately performs first scanning (for the homeward path) and second scanning (for the outward path). In the first scanning, a beam spot formed on the screen (1) by the light beam moves from the first end (111) toward the second end (112). In the second scanning, the beam spot formed on the screen (1) by the light beam moves from the second end (112) toward the first end (111). When the tilt angle ($\varphi 1$) is an angle of depression, the projection unit (40) finishes performing the second scanning, and starts performing the first scanning, at a predetermined location closer to the second end (112) than to the first end (111).

This aspect increases the resolution of the virtual image, compared to a situation where the second scanning is performed from the second end (112) through the first end (111).

In a display system (10) according to a seventh aspect, which may be implemented in conjunction with any one of the first to sixth aspects, the drive control unit (51) performs recovery processing, every time the screen (1) is moved through the correction processing. The drive control unit (51) brings, during the recovery processing, the screen (1) back to a home position in the movement direction (X).

This aspect allows the screen (1) to be moved by a shorter distance, compared to a situation where no recovery processing is performed.

In a display system (10) according to an eighth aspect, which may be implemented in conjunction with any one of the first to seventh aspects, the screen (1) has a first end (111) and a second end (112). The first end (111) corresponds to a distal end, located more distant from the projection unit (40), of the reference plane (601). The second end (112) corresponds to a proximal end, located closer to the projection unit (40), of the reference plane (601). The projection unit (40) alternately performs first scanning (for the homeward path) and second scanning (for the outward path). In the first scanning, a beam spot, formed on the screen (1) by the light beam, moves from the first end (111) toward the second end (112). In the second scanning, the beam spot, formed on the screen (1) by the light beam, moves from the second end (112) toward the first end (111). The projection unit (40) includes an irradiation unit (3) and a projection optical system (4). The irradiation unit (3) irradiates the screen (1) with the light beam that scans the screen (1). The projection optical system (4) projects the virtual image (300) onto a target space (400) with the light beam transmitted through the screen (1). The screen (1) is arranged in the movement direction (X) between the irradiation unit (3) and the projection optical system (4). The drive control unit (51) has the screen (1) moved in the movement direction (X) toward the projection optical system (4) during the first scanning. The drive control unit (51) has the screen (1) moved in the movement direction (X) toward the irradiation unit (3) during the second scanning.

This aspect allows a first virtual image (301) to be formed by being projected onto the projection plane (600).

In a display system (10) according to a ninth aspect, which may be implemented in conjunction with any one of the first to eighth aspects, the virtual image (300) includes a first virtual image (301) and a second virtual image (302). The first virtual image (301) is projected onto the projection plane (600) such that the first virtual image (301) is formed on a plane generally parallel to the projection plane (600). The second virtual image (302) is projected onto the projection plane (600) such that the second virtual image (302) crosses the projection plane (600).

This aspect allows not only the first virtual image (301) but also the second virtual image (302) to be matched with the projection plane (600).

In a display system (10) according to a tenth aspect, which may be implemented in conjunction with the ninth aspect, the screen (1) has a first end (111) and a second end (112). The first end (111) corresponds to a distal end, located more distant from the projection unit (40), of the reference plane (601). The second end (112) corresponds to a proximal end, located closer to the projection unit (40), of the reference plane (601). The projection unit (40) alternately performs first scanning (for the homeward path) and second scanning (for the outward path). In the first scanning, a beam spot, formed on the screen (1) by the light beam, moves from the first end (111) toward the second end (112). In the second scanning, the beam spot, formed on the screen (1) by the light beam, moves from the second end (112) toward the first end (111). The projection unit (40) projects the first virtual image (301) onto the projection plane (600) during the first scanning, and projects the second virtual image (302) onto the projection plane (600) during the second scanning.

This aspect allows both of the first virtual image (301) and the second virtual image (302) to be projected onto the projection plane (600) simultaneously.

In a display system (10) according to an eleventh aspect, which may be implemented in conjunction with the ninth aspect, the screen (1) has a first end (111) and a second end (112). The first end (111) corresponds to a distal end, located more distant from the projection unit (40), of the reference plane (601). The second end (112) corresponds to a proximal end, located closer to the projection unit (40), of the reference plane (601). The projection unit (40) alternately performs first scanning (for the homeward path) and second scanning (for the outward path). In the first scanning, a beam spot, formed on the screen (1) by the light beam, moves from the first end (111) toward the second end (112). In the second scanning, the beam spot, formed on the screen (1) by the light beam, moves from the second end (112) toward the first end (111). The drive control unit (51) has the screen (1) moved in the movement direction (X) so as to form the first virtual image (301) during the first scanning. The drive control unit (51) has the screen (1) fixed at a predetermined position in the movement direction (X) so as to form the second virtual image (302) during the second scanning.

This aspect allows both of the first virtual image (301) and the second virtual image (302) to be projected onto the projection plane (600) simultaneously.

In a display system (10) according to a twelfth aspect, which may be implemented in conjunction with any one of the first to eleventh aspects, the screen (1) is tilted with respect to a plane (503) that is perpendicular to the movement direction (X).

This aspect allows, when the projection plane (600) is a flat road surface (such as the first road surface 601), the virtual image (600) to be projected onto the projection plane (600) with the screen (1) fixed.

A display system (10) according to a thirteenth aspect, which may be implemented in conjunction with any one of the first to twelfth aspects, further includes a detection device (6) for detecting the tilt angle ($\varphi 1$).

This aspect allows the drive control unit (51) to perform the correction processing based on a result of detection by the detection device (6).

A moving vehicle (such as the automobile 100) according to a fourteenth aspect includes the display system (10) according to any one of the first to thirteenth aspects, and a reflective member (such as a windshield 101) for reflecting the light beam coming from the projection unit (40).

This aspect increases, even when the projection plane (600) is tilted with respect to the reference plane (601), the degree of matching between the projection plane (600) and the virtual image (300) projected onto the projection plane (600).

A method for controlling a display system (10) according to a fifteenth aspect is designed to control a display system (10) including a screen (1), a drive control unit (51), and a projection unit (40). The screen (1) is movable in a movement direction (X). The drive control unit (51) has the screen (1) moved in the movement direction (X). The projection unit (40) renders an image on the screen (1) by irradiating the screen (1) with a light beam that scans the screen (1) and projects a virtual image (300) onto a projection plane (600) with the light beam transmitted through the screen (1). The method for controlling the display system (10) includes making the drive control unit (51) perform correction processing. The correction processing includes having the screen (1) moved in the movement direction (X) such that an optical path leading to a rendering point on the screen (1) varies its length (201) according to a tilt angle ($\varphi 1$) defined by the projection plane (600) with respect to a reference plane (601).

This method increases, even when the projection plane (600) is tilted with respect to the reference plane (601), the degree of matching between the projection plane (600) and the virtual image (300) projected onto the projection plane (600).

A non-transitory storage medium according to a sixteenth aspect stores thereon a program that is designed to make a computer system execute the method for controlling the display system (10) according to the fifteenth aspect.

This aspect increases, even when the projection plane (600) is tilted with respect to the reference plane (601), the degree of matching between the projection plane (600) and the virtual image (300) projected onto the projection plane (600).

While various embodiments have been described herein above, it is to be appreciated that various changes in form and detail may be made without departing from the spirit and scope of the present disclosure presently or hereafter claimed.

In this application, the entire contents of Japanese Patent Application No. 2018-069732 mentioned above are hereby incorporated by reference for all purposes.

The invention claimed is:

1. A display system comprising:
   a screen configured to be movable in a movement direction;
   a drive control unit configured to have the screen moved in the movement direction; and
   a projection unit configured to render an image on the screen by irradiating the screen with a light beam that scans the screen and to project a virtual image onto a projection plane with the light beam transmitted through the screen, the drive control unit being configured to perform correction processing of having the screen moved in the movement direction such that an optical path leading to a rendering point on the screen varies its length according to a tilt angle defined by the projection plane with respect to a reference plane.

2. The display system of claim 1, wherein
the projection plane is a road surface.

3. The display system of claim 2, wherein
the drive control unit is configured to have, during the correction processing, the screen moved in the movement direction such that when the tilt angle is an angle of elevation, the optical path has a shorter length than when the virtual image is projected onto the reference plane as the projection plane.

4. The display system of claim 1, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the drive control unit performs the correction processing during either the first scanning or the second scanning.

5. The display system of claim 1, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the drive control unit performs the correction processing during each of the first scanning and the second scanning.

6. The display system of claim 1, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the projection unit is configured to, when the tilt angle is an angle of depression, finish performing the second scanning, and start performing the first scanning, at a predetermined location closer to the second end than to the first end.

7. The display system of claim 1, wherein
the drive control unit is configured to perform recovery processing of bringing, every time the screen is moved through the correction processing, the screen back to a home position in the movement direction.

8. The display system of claim 1, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end,
the projection unit includes:
an irradiation unit configured to irradiate the screen with the light beam that scans the screen; and
a projection optical system configured to project the virtual image onto a target space with the light beam transmitted through the screen,
the screen is arranged in the movement direction between the irradiation unit and the projection optical system, and
the drive control unit is configured to:
have the screen moved in the movement direction toward the projection optical system during the first scanning; and
have the screen moved in the movement direction toward the irradiation unit during the second scanning.

9. The display system of claim 1, wherein
the virtual image includes:
a first virtual image projected onto the projection plane such that the first virtual image is formed on a plane that is generally parallel to the projection plane; and
a second virtual image projected onto the projection plane such that the second virtual image crosses the projection plane.

10. The display system of claim 9, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the projection unit is configured to:
project the first virtual image onto the projection plane during the first scanning; and
project the second virtual image onto the projection plane during the second scanning.

11. The display system of claim 9, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the drive control unit is configured to:

have the screen moved in the movement direction so as to form the first virtual image during the first scanning; and have the screen fixed at a predetermined position in the movement direction so as to form the second virtual image during the second scanning.

12. The display system of claim 1, wherein
the screen is tilted with respect to a plane that is perpendicular to the movement direction.

13. The display system of claim 1, further comprising a detection device configured to detect the tilt angle.

14. A moving vehicle comprising:
the display system of claim 1; and
a reflective member configured to reflect the light beam coming from the projection unit.

15. A method for controlling a display system, the display system including:
a screen configured to be movable in a movement direction;
a drive control unit configured to have the screen moved in the movement direction; and
a projection unit configured to render an image on the screen by irradiating the screen with a light beam that scans the screen and to project a virtual image onto a projection plane with the light beam transmitted through the screen,
the method comprising making the drive control unit perform connection processing of having the screen moved in the movement direction such that an optical path leading to a rendering point on the screen varies its length according to a tilt angle defined by the projection plane with respect to a reference plane.

16. A non-transitory storage medium that stores thereon a program designed to make a computer system execute the method of claim 15.

17. The display system of claim 2, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the drive control unit performs the correction processing during either the first scanning or the second scanning.

18. The display system of claim 2, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the drive control unit performs the correction processing during each of the first scanning and the second scanning.

19. The display system of claim 2, wherein
the screen has a first end corresponding to a distal end, located more distant from the projection unit, of the reference plane and a second end corresponding to a proximal end, located closer to the projection unit, of the reference plane,
the projection unit is configured to alternately perform first scanning to move a beam spot, formed on the screen by the light beam, from the first end toward the second end and second scanning to move the beam spot, formed on the screen by the light beam, from the second end toward the first end, and
the projection unit is configured to, when the tilt angle is an angle of depression, finish performing the second scanning, and start performing the first scanning, at a predetermined location closer to the second end than to the first end.

20. The display system of claim 2, wherein
the virtual image includes:
a first virtual image projected onto the projection plane such that the first virtual image is formed on a plane that is generally parallel to the projection plane; and
a second virtual image projected onto the projection plane such that the second virtual image crosses the projection plane.

* * * * *